United States Patent
Basu et al.

(10) Patent No.: US 12,190,621 B2
(45) Date of Patent: Jan. 7, 2025

(54) GENERATING WEIGHTED CONTEXTUAL THEMES TO GUIDE UNSUPERVISED KEYPHRASE RELEVANCE MODELS

(71) Applicant: Adobe Inc., San Jose, CA (US)

(72) Inventors: Debraj Debashish Basu, Los Angeles, CA (US); Shankar Venkitachalam, San Jose, CA (US); Vinh Khuc, Campbell, CA (US); Deepak Pai, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 420 days.

(21) Appl. No.: 17/653,414

(22) Filed: Mar. 3, 2022

(65) Prior Publication Data

US 2023/0282018 A1 Sep. 7, 2023

(51) Int. Cl.
*G06F 17/00* (2019.01)
*G06F 40/295* (2020.01)
*G06N 20/00* (2019.01)
*G06V 30/19* (2022.01)
*G06V 30/416* (2022.01)

(52) U.S. Cl.
CPC .......... *G06V 30/416* (2022.01); *G06F 40/295* (2020.01); *G06N 20/00* (2019.01); *G06V 30/19113* (2022.01); *G06V 30/19127* (2022.01)

(58) Field of Classification Search
CPC ........... G06V 30/416; G06V 30/19113; G06V 30/19127; G06F 40/295; G06F 40/279; G06F 16/345; G06F 18/24323; G06N 20/00; G06N 20/20; G06N 3/045; G06N 5/01; G06N 7/01
See application file for complete search history.

(56) References Cited

U.S. PATENT DOCUMENTS

| | | | | |
|---|---|---|---|---|
| 8,538,970 | B1 * | 9/2013 | Tucker | G06F 16/9535 707/751 |
| 11,016,997 | B1 * | 5/2021 | Huang | G06F 16/285 |
| 2007/0061320 | A1 * | 3/2007 | Surendran | G06F 16/345 707/999.005 |
| 2019/0155944 | A1 * | 5/2019 | Mahata | G06F 16/93 |

OTHER PUBLICATIONS

S. Brin and L. Page, "The anatomy of a large-scale hypertextual web search engine," Comput. Networks, vol. 30, No. 1-7, pp. 107-117, 1998. [Online]. Available: https://doi.org/10.1016/S0169-7552(98)00110-X.

(Continued)

*Primary Examiner* — Greta L Robinson
(74) *Attorney, Agent, or Firm* — Keller Preece PLLC

(57) ABSTRACT

The present disclosure relates to systems, methods, and non-transitory computer readable media that utilize intelligent contextual bias weights for informing keyphrase relevance models to extract keyphrases. For example, the disclosed systems generate a graph from a digital document by mapping words from the digital document to nodes of the graph. In addition, the disclosed systems determine named entity bias weights for the nodes of the graph utilizing frequencies with which the words corresponding to the nodes appear within named entities identified from the digital document. Moreover, the disclosed systems generate a keyphrase summary for the digital document utilizing the graph and a machine learning model biased according to the named entity bias weights for the nodes of the graph.

20 Claims, 12 Drawing Sheets

(56) References Cited

OTHER PUBLICATIONS

S. Sia, A. Dalmia, and S. J. Mielke, "Tired of topic models? clusters of pretrained word embeddings make for fast and good topics too!" in Proceedings of the 2020 Conference on Empirical Methods in Natural Language Processing (EMNLP). Online: Association for Computational Linguistics, Nov. 2020, pp. 1728-1736. [Online]. Available: https://www.aclweb.org/anthology/2020.emnlp-main.135.
E. Papagiannopoulou and G. Tsoumakas, "A review of keyphrase extraction," CoRR, vol. abs/1905.05044, 2019. [Online]. Available: http://arxiv.org/abs/1905.05044.
C. Gutwin, G. Paynter, I. Witten, C. Nevill-Manning, and E. Frank, "Improving browsing in digital libraries with keyphrase indexes," Decision Support Systems, vol. 27, No. 1-2, pp. 81-104, 1999.
I. Augenstein, M. Das, S. Riedel, L. Vikraman, and A. McCallum, "Semeval 2017 task 10: Scienceie-extracting keyphrases and relations from scientific publications," arXiv preprint arXiv:1704.02853, 2017.
A. Hulth and B. Megyesi, "A study on automatically extracted keywords in text categorization," in Proceedings of the 21st International Conference on Computational Linguistics and 44th Annual Meeting of the Association for Computational Linguistics, 2006, pp. 537-544.
Y. Zhang, N. Zincir-Heywood, and E. Milios, "World wide web site summarization," Web intelligence and agent systems: an international journal, vol. 2, No. 1, pp. 39-53, 2004.
R. Campos, V. Mangaravite, A. Pasquali, A. Jorge, C. Nunes, and A. Jatowt, "Yake! keyword extraction from single documents using multiple local features," Inf. Sci., vol. 509, pp. 257-289, 2020. [Online]. Available: https://doi.org/10.1016/j.ins.2019.09.013.
J. Ramos, "Using tf-idf to determine word relevance in document queries," Jan. 2003.
R. Mihalcea and p. Tarau, "TextRank: Bringing order into text," in Proceedings of the 2004 Conference on Empirical Methods in Natural Language Processing. Barcelona, Spain: Association for Computational Linguistics, Jul. 2004, pp. 404-411. [Online]. Available: https://www.aclweb.org/anthology/W04-3252.
C. Florescu and C. Caragea, "PositionRank: An unsupervised approach to keyphrase extraction from scholarly documents," in Proceedings of the 55th Annual Meeting of the Association for Computational Linguistics (vol. 1: Long Papers). Vancouver, Canada: Association for Computational Linguistics, Jul. 2017, pp. 1105-1115. [Online]. Available: https://www.aclweb.org/anthology/P17-1102.
A. Bougouin, F. Boudin, and B. Daille, "TopicRank: Graph-based topic ranking for keyphrase extraction," in Proceedings of the Sixth International Joint Conference on Natural Language Processing. Nagoya, Japan: Asian Federation of Natural Language Processing, Oct. 2013, pp. 543-551. [Online]. Available: https://www.aclweb.org/anthology/I13-1062.
S. Sun, C. Xiong, Z. Liu, Z. Liu, and J. Bao, "Joint keyphrase chunking and salience ranking with Bert," Corr, vol. abs/2004.13639, 2020. [Online]. Available: https://arxiv.org/abs/2004.13639.
J. Devlin, M. Chang, K. Lee, and K. Toutanova, "BERT: pretraining of deep bidirectional transformers for language understanding," CoRR, vol. abs/1810.04805, 2018. [Online]. Available: http://arxiv.org/abs/1810.04805.
Y.-C. Chen, Z. Gan, Y. Cheng, J. Liu, and J. Liu, "Distilling knowledge learned in BERT for text generation," in Proceedings of the 58th Annual Meeting of the Association for Computational Linguistics. Online: Association for Computational Linguistics, Jul. 2020, pp. 7893-7905. [Online]. Available: https://aclanthology.org/2020.acl-main.705.
L. Page, S. Brin, R. Motwani, and T. Winograd, "The pagerank citation ranking : Bringing order to the web," in WWW 1999, 1999.
F. A. Rodrigues, "Network centrality: an introduction," 2019.

D. Mahata, J. Kuriakose, R. R. Shah, and R. Zimmermann, "Key2Vec: Automatic ranked keyphrase extraction from scientific articles using phrase embeddings," in Proceedings of the 2018 Conference of the North American Chapter of the Association for Computational Linguistics: Human Language Technologies, vol. 2 (Short Papers). New Orleans, Louisiana: Association for Computational Linguistics, Jun. 2018, pp. 634-639. [Online]. Available: https://www.aclweb.org/anthology/N18-2100.
F. Boudin, "Unsupervised keyphrase extraction with multipartite graphs," in Proceedings of the 2018 Conference of the North American Chapter of the Association for Computational Linguistics: Human Language Technologies, NAACL-HLT, New Orleans, Louisiana, USA, Jun. 1-6, 2018, vol. 2 (Short Papers), M. A. Walker, H. Ji, and A. Stent, Eds. Association for Computational Linguistics, 2018, pp. 667-672. [Online]. Available: https://doi.org/10.18653/v1/n18-2105.
Z. Liu, W. Huang, Y. Zheng, and M. Sun, "Automatic keyphrase extraction via topic decomposition," in Proceedings of the 2010 conference on empirical methods in natural language processing, 2010, pp. 366-376.
L. Sterckx, T. Demeester, J. Deleu, and C. Develder, "Topical word importance for fast keyphrase extraction," in Proceedings of the 24th International Conference on World Wide Web Companion, WWW 2015, Florence, Italy, May 18-22, 2015—Companion vol. A. Gangemi, S. Leonardi, and A. Panconesi, Eds. ACM, 2015, pp. 121-122. [Online]. Available: https://doi.org/10.1145/2740908.2742730.
K. Bennani-Smires, C. Musat, A. Hossmann, M. Baeriswyl, and M. Jaggi, "Simple unsupervised keyphrase extraction using sentence embeddings," in Proceedings of the 22nd Conference on Computational Natural Language Learning. Brussels, Belgium: Association for Computational Linguistics, Oct. 2018, pp. 221-229. [Online]. Available: https://aclanthology.org/K18-1022.
Y. Sun, H. Qiu, Y. Zheng, Z. Wang, and C. Zhang, "Sifrank: A new baseline for unsupervised keyphrase extraction based on pre-trained language model," IEEE Access, vol. 8, pp. 10 896-10 906, 2020. [Online]. Available: https://doi.org/10.1109/ACCESS.2020.2965087.
J. Leskovec, M. Grobelnik, and N. Milic-Frayling, "Learning substructures of document semantic graphs for document summarization," 2004.
M. Honnibal, I. Montani, S. Van Landeghem, and A. Boyd, "spaCy: Industrial-strength Natural Language Processing in Python," 2020.
T. Wolf, L. Debut, V. Sanh, J. Chaumond, C. Delangue, A. Moi, P. Cistac, T. Rault, R. Louf, M. Funtowicz, and J. Brew, "Huggingface's transformers: State-of-the-art natural language processing," CoRR, vol. abs/1910.03771, 2019. [Online]. Available: http://arxiv.org/abs/1910.03771.
Y. Liu, M. Ott, N. Goyal, J. Du, M. Joshi, D. Chen, O. Levy, M. Lewis, L. Zettlemoyer, and V. Stoyanov, "Roberta: A robustly optimized BERT pretraining approach," CoRR, vol. abs/1907.11692, 2019. [Online]. Available: http://arxiv.org/abs/1907.11692.
X. Wan and J. Xiao, "Single document keyphrase extraction using neighborhood knowledge," in Proceedings of the Twenty-Third AAAI Conference on Artificial Intelligence, AAAI 2008, Chicago, Illinois, USA, Jul. 13-17, 2008, D. Fox and C. P. Gomes, Eds. AAAI Press, 2008, pp. 855-860. [Online]. Available: http://www.aaai.org/Library/AAAI/2008/aaai08-136.php.
M. E. Peters, M. Neumann, M. Iyyer, M. Gardner, C. Clark, K. Lee, and L. Zettlemoyer, "Deep contextualized word representations," CoRR, vol. abs/1802.05365, 2018. [Online]. Available: http://arxiv.org/abs/1802.05365.
S. Arora, Y. Liang, and T. Ma, "A simple but tough-to-beat baseline for sentence embeddings," in 5th International Conference on Learning Representations, ICLR 2017, Toulon, France, Apr. 24-26, 2017, Conference Track Proceedings. OpenReview.net, 2017. [Online]. Available: https://openreview.net/forum?id=SyK00v5xx.

\* cited by examiner

GENERATING WEIGHTED CONTEXTUAL THEMES TO GUIDE UNSUPERVISED KEYPHRASE RELEVANCE MODELS

BACKGROUND

Recent years have seen significant advancements in computer-implemented models for intelligently analyzing, retrieving, and recommending digital documents. For example, recent improvements have allowed computer models to reduce digital documents to relevant phrases that can then be utilized for a variety of downstream tasks, such as generating digital document recommendations. Despite these advancements, a number of technical shortcomings continue to exist in the field of keyphrase relevant extraction, particular with regard to flexibility, efficiency, and accuracy of implementing computing devices.

SUMMARY

This disclosure describes one or more embodiments of systems, methods, and non-transitory computer readable media that solve one or more of the foregoing or other problems in the art by determining intelligent contextual bias weights for informing keyphrase relevance models to more accurately, efficiently, and flexibly extract keyphrases from digital documents. In particular, the disclosed systems utilize contextual representations for topic modeling to guide a network centrality analysis via a graph of document tokens in favor of phrases that are closely associated with higher-level latent themes embedded in a document. These representations serve as an interface to borrowing open-world knowledge stored in model parameters. By unifying contextual themes with other semantic information extracted from the document, the disclosed systems generate an improved prior for performing a biased random walk over a network of atomic units of the document.

To illustrate, the disclosed systems generate a graph of tokens and parts of speech extracted from a digital document. In one or more embodiments, the disclosed systems also identify themes of the digital document (e.g., utilizing a Gaussian mixture clustering model). Moreover, the disclosed systems analyze the digital document and the graph to determine named entity bias weights (weights emphasizing nodes/words contributing to named entities in the digital document), document position bias weights (weights emphasizing nodes/words that appear early in a digital document), and theme contribution bias weights (weights emphasizing nodes/words that correspond to an identified theme). The disclosed systems then utilize these weights to bias a machine learning model (e.g., a random walk ranking model) in extracting keyphrases from the graph representation of the digital document.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
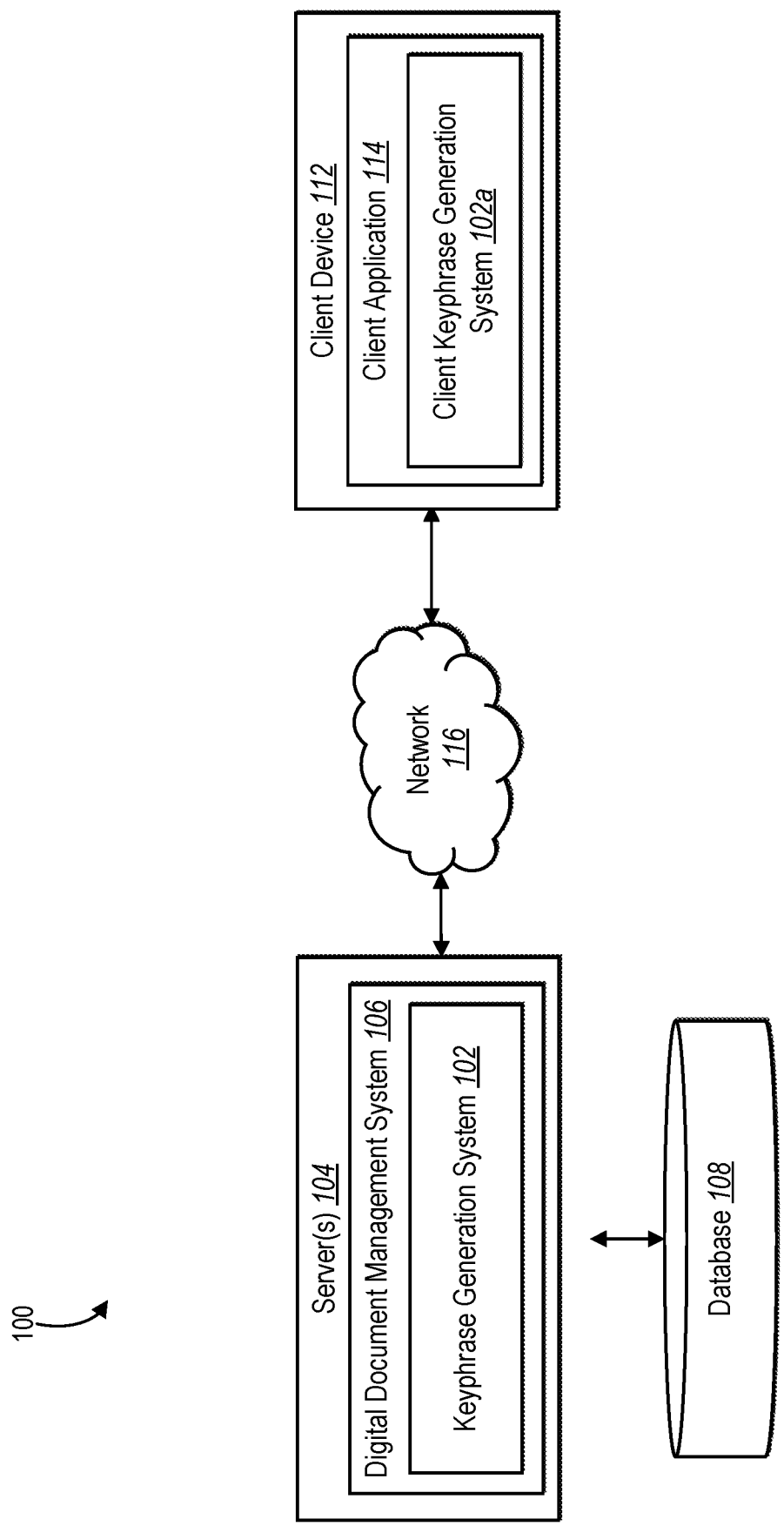
FIG. 1 illustrates an example system environment in which a keyphrase generation system operates in accordance with one or more embodiments.

This disclosure describes one or more embodiments of a keyphrase generation system that utilizes an improved prior for machine learning models (e.g., random walk ranking models) that incorporates semantic information extracted from a digital document and corresponding graph representation. Conventional systems suffer from a number of technical deficiencies with regard to flexibility, efficiency, and accuracy. For example, some conventional systems utilize contextual representations from massive, supervised learning models to determine keyphrases for digital documents. These approaches, however, are rigid in that that they struggle to extend to multiple domains. Moreover, these conventional systems require significant fine-tuning and data annotation, with excessive computational resources (e.g., memory and processing power). In particular, these conventional systems do not generalize across multiple domains without critically relying on large volumes of annotated data. Furthermore, such supervised deep learning approaches struggle with scalability and transparency challenges. Indeed, these methods cannot rank order extracted keyphrases unless trained on appropriately annotated data and are unable to process long documents at once (which can often be limiting for practical purposes).

Some conventional systems have emitted a set of keyphrases spanning topics in a text document. These systems, however, are either heavily reliant on topic models which require significant maintenance (and corresponding computer resources) or rely on naïve heuristics. For example, some conventional systems arrive at topics by hierarchically grouping words using textual similarity or using certain data structures within the document (e.g., title or first line) as the overall theme. These approaches hinder accuracy in that they are often not effective and are not readily extensible to different domains.

In one or more implementations, the keyphrase generation system models relevance utilizing a network centrality framework while imposing priors on semantic units. For example, the keyphrase generation system utilizes contextual representations as a source of weak supervision about higher-level latent themes embedded in a document. For instance, the keyphrase generation system employs positional, topical, and entity priors on the semantic units, which are further enriched by using representations from language models to inform these topics. As outlined in greater detail below, the keyphrase generation system can accurately, efficiently, and flexibly generate keyphrase summaries from digital document that are tolerant to domain shift and reflect significant gains over conventional systems.

To illustrate, in one or more embodiments, the keyphrase generation system generates a graph representation from a digital document. In particular, the keyphrase generation system utilizes a tokenizer model to extract and generate tokens representing words. The keyphrase generation system also determines parts of speech corresponding to the tokens. The keyphrase generation system generates a graph by mapping the tokens and parts of speech to nodes and connecting the nodes based on word vicinities within the digital document. For example, the keyphrase generation system generates graph edges based on word co-occurrences within a threshold word window within the digital document.

As mentioned above, in one or more embodiments the keyphrase generation system utilizes topical, position, and entity priors to bias a machine learning model in extracting keyphrases. For example, in one or more embodiments, the keyphrase generation system determines named entity bias weights, document position bias weights, and theme contribution bias weights for the nodes of the graph. The keyphrase generation system utilizes these weights to bias a random walk in determining word scores (e.g., relevance scores, such as PageRank scores) for individual nodes.

To illustrate, the keyphrase generation system generates named entity bias weights based on the contribution of individual nodes to named entities within the digital document. The keyphrase generation system utilizes a named entity recognition model to extract named entities (e.g., named persons or places) within the digital document. The keyphrase generation system then determines frequency (e.g., a number of instances) that each node/word is utilized in the identified named entities. The keyphrase generation system generates named entity bias weights based on the number of instances that each word is utilized within a named entity.

Moreover, the keyphrase generation system also generates document position bias weights. For example, the keyphrase generation system determines a position of each word/node relative to a beginning of the digital document. To illustrate, the keyphrase generation system determines a distance from the beginning of the digital document, such as the number of words prior to a particular word within the digital document. The keyphrase generation system generates document position bias weights based on the position of each instance of the word within the digital document.

In addition, the keyphrase generation system also determines theme contribution bias weights. For example, in one or more embodiments, the keyphrase generation system extracts themes (e.g., three themes) from the digital document. To illustrate, the keyphrase generation system generates embeddings of words/nodes in the graph and then utilizes a clustering model (e.g., a Gaussian mixture clustering model) to group the embeddings. The keyphrase generation system identifies themes based on these embedding groups. Moreover, the keyphrase generation system generates theme contribution bias weights based on the relative contribution of each word to each of the identified themes.

Upon identifying these bias weights, the keyphrase generation system utilizes the bias weights to determine a measure of relevance for each word/node in the graph. For example, the keyphrase generation system biases a random walk ranking model utilizing the named entity bias weights, document position bias weights, and theme contribution bias weights for the nodes of the graph. The keyphrase generation system utilizes the random walk ranking model in conjunction with the graph to determine word scores/relevance scores for each node of the graph. The keyphrase generation system then combines these scores to identify and surface keyphrases of the digital document.

For example, the keyphrase generation system samples candidate keyphrases from the digital document and identifies words corresponding to the candidate keyphrases. The keyphrase generation system determines keyphrase scores by combining word scores corresponding to the words within each keyphrase. In this manner, the keyphrase generation system determines keyphrase rankings for candidate keyphrases. Moreover, in one or more embodiments, the keyphrase generation system filters keyphrase rankings to encourage syntactic diversity. For example, the keyphrase generation system utilizes a lexical similarity threshold to filter or remove keyphrases in generating a filtered keyphrase ranking. In one or more embodiments, the keyphrase generation system generates a keyphrase summary by selecting keyphrases from a keyphrase ranking (e.g., the filtered keyphrase ranking).

Embodiments of the keyphrase generation system can provide a variety of advantages over these conventional systems, particularly with regard to flexibility, efficiency, and accuracy. Indeed, exemplary embodiments of the keyphrase generation system that leverage contextual priors demonstrates superior accuracy performance across baselines. Furthermore, because of the architecture of the proposed model, the keyphrase generation system can be implemented on documents in a variety of languages.

In addition, because the keyphrase generation system can extract keyphrases in an unsupervised manner (e.g., without supervised training), the keyphrase generation system does not require the significant computing resources required by conventional systems to tune model parameters or gather, generate, and store annotated data. Furthermore, as a result of this unsupervised approach, the keyphrase generation system is tolerant to distribution shifts without requiring more annotated data followed by extensive training and fine-tuning.

In addition, the keyphrase generation system also provides a variety of improvements relative to conventional systems that have previously analyzed topics in a text document. Indeed, in contrast to using topic models that require significant maintenance or naïve heuristics, the keyphrase generation system can utilize a clustering model (e.g., Gaussian mixture model) to identify pertinent themes and utilize these themes to determine theme contribution bias weights for nodes of the graph. Moreover, in one or more embodiments the keyphrase generation system implements these weights as priors to a machine learning model. This approach provides for improved accuracy and flexibility while avoiding many of the computing inefficiencies of conventional systems.

Additional detail regarding the keyphrase generation system will now be provided with reference to the figures. For example, FIG. 1 illustrates a schematic diagram of an example system environment (or "environment") 100 for implementing a keyphrase generation system 102 in accordance with one or more embodiments. An overview of the keyphrase generation system 102 is described in relation to FIG. 1. Thereafter, a more detailed description of the components and processes of the keyphrase generation system 102 is provided in relation to the subsequent figures.

As shown, the environment 100 includes server(s) 104, a database 108, a client device 112, and a network 116. Each of the components of the environment communicate via the network 116, and the network 116 is any suitable network over which computing devices/processing devices communicate. Example networks are discussed in more detail below in relation to FIG. 11.

As mentioned, the environment 100 includes a client device 112. The client device 112 is one of a variety of computing devices, including a smartphone, a tablet, a smart television, a desktop computer, a laptop computer, a virtual reality device, an augmented reality device, or another computing device as described in relation to FIG. 11. Although FIG. 1 illustrates a single instance of the client device 112, in some embodiments, the environment 100 includes multiple different client devices, each associated with a different user.

The client device 112 communicates with the server(s) 104 via the network 116. For example, the client device 112 provides information to the server(s) 104 such as one or more digital documents, a query regarding one or more digital documents, and/or client device interactions. Thus, in some cases, the keyphrase generation system 102 implemented via the server(s) 104 provides and receives information based on client device interaction via the client device 112. The client device 112 also receives information from the server(s) 104 such as digital documents and/or keyphrase summaries reflecting one or more keyphrases corresponding to digital documents.

A keyphrase can include one or more words or phrases selected to represent a digital document. For example, a keyphrase includes a group of words or phrases relevant to a topic, point, theme, or thesis of a digital document. To illustrate, in the context of a digital document regarding battles of the Civil War, the keyphrase generation system 102 extracts a keyphrase of "Civil War battles" from a digital document. Similarly, a keyphrase summary includes a digital representation of one or more keyphrases corresponding to a digital document. For instance, a keyphrase summary include an indicator identifying, flagging, or indexing a digital document to one or more keyphrases and/or a visual representation indicating one or more keyphrases (e.g., "This document discusses Civil War generals and major Civil War battles").

As shown in FIG. 1, the client device 112 includes a client application 114. In one or more embodiments, the client application 114 is a web application, a native application installed on the client device 112 (e.g., a mobile application, a desktop application, etc.), or a cloud-based application where all or part of the functionality is performed by the server(s) 104. Based on instructions from the client application 114, the client device 112 presents or displays information to a user, including a digital document, a query response, and/or keyphrase summary corresponding to a digital document.

As illustrated in FIG. 1, the environment 100 includes the server(s) 104. The server(s) 104 generates, tracks, stores, processes, receives, and transmits electronic data, such as digital documents. For example, the server(s) 104 receives data from the client device 112 (e.g., digital queries or digital documents). In response, the server(s) 104 transmits data to the client device 112 to cause the client device 112 to provide information for display (e.g., query response, digital documents, and/or keyphrase summaries).

In some embodiments, the server(s) 104 communicates with the client device 112 to transmit and/or receive data via the network 116. In some embodiments, the server(s) 104 comprises a distributed server where the server(s) 104 includes a number of server devices distributed across the network 116 and located in different physical locations. In one or more implementations, the server(s) 104 comprise a content server, an application server, a communication server, a web-hosting server, a multidimensional server, or a machine learning server. Moreover, in one or more embodiments, the server(s) 104 further access and utilize the database 108 to store and retrieve information such as digital documents. Indeed, the server(s) 104 can query the database 108 for digital documents utilizing keyphrases or keyphrase summaries.

As further shown in FIG. 1, the server(s) 104 also includes the keyphrase generation system 102 as part of a digital document management system 106. For example, in one or more implementations, the digital document management system 106 stores, generates, modifies, edits, enhances, provides, distributes, and/or shares digital content, such as digital documents. For example, the digital document management system 106 provides tools for the client device 112, via the client application 114, to display or manipulate digital documents and/or search for digital documents.

In one or more embodiments, the server(s) 104 includes all, or a portion of, the keyphrase generation system 102. For example, the keyphrase generation system 102 operates on the server(s) 104 to determine keyphrases and/or keyphrase summaries corresponding to digital documents. Moreover, the keyphrase generation system 102 operates on the server(s) 104 to utilize keyphrases to index, sort, search, and/or retrieve digital documents.

In certain cases, the client device 112 includes all or part of the keyphrase generation system 102. Indeed, as illustrated, the client device 112 can include a client keyphrase generation system 102a with the same or similar functionality to the keyphrase generation system 102. For example, the client device 112 can generate keyphrase summaries for digital documents. In some embodiments, the client keyphrase generation system 102a includes a web hosting application that allows the client device 112 to interact with the server(s) 104. To illustrate, in one or more implementations, the client device 112 accesses a web page supported and/or hosted by the server(s) 104.

Figure 2:
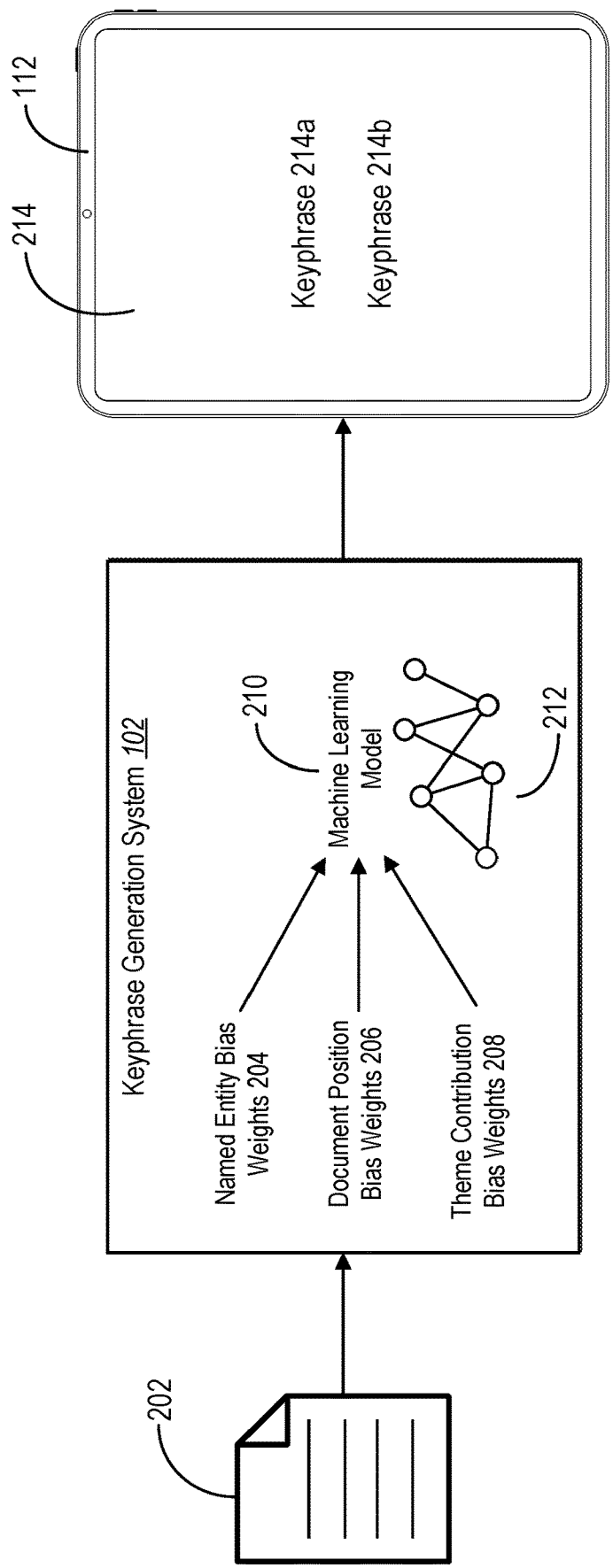
FIG. 2 illustrates an overview of generating a keyphrase summary of a digital document utilizing named entity bias weights, document position bias weights, and theme contribution bias weights in accordance with one or more embodiments.

As mentioned above, the keyphrase generation system 102 can generate keyphrase summaries for one or more digital documents. FIG. 2 illustrates the keyphrase generation system 102 generating a keyphrase summary 214 from a digital document 202 in accordance with one or more embodiments. Specifically, FIG. 2 illustrates the keyphrase generation system 102 utilizing a graph 212 and the machine learning model 210 to generate the keyphrase summary 214 from the digital document 202. Moreover, as illustrated in FIG. 2, the keyphrase generation system 102 biases the machine learning model analysis according to named entity bias weights 204, document position bias weights 206, and theme contribution bias weights 208.

As illustrated in FIG. 2, the keyphrase generation system 102 identifies the digital document 202, which includes a plurality of words. The digital document 202 can include a variety of electronic representations of digital text, such as a webpage, a digital article (e.g., a scholarly article), a digital magazine, a digital newspaper, or a digital image document (e.g., a PDF document portraying written text). In some embodiments, the keyphrase generation system 102 identifies the digital document 202 from a repository of digital documents, such as websites available via the Internet, a repository of scholarly articles, personal documents stored via a cloud server account, or documents stored on a client device. Although FIG. 2 illustrates a single document, the keyphrase generation system 102 can operate with regard to a large volume of digital documents and a variety of different document types.

Figure 4A:
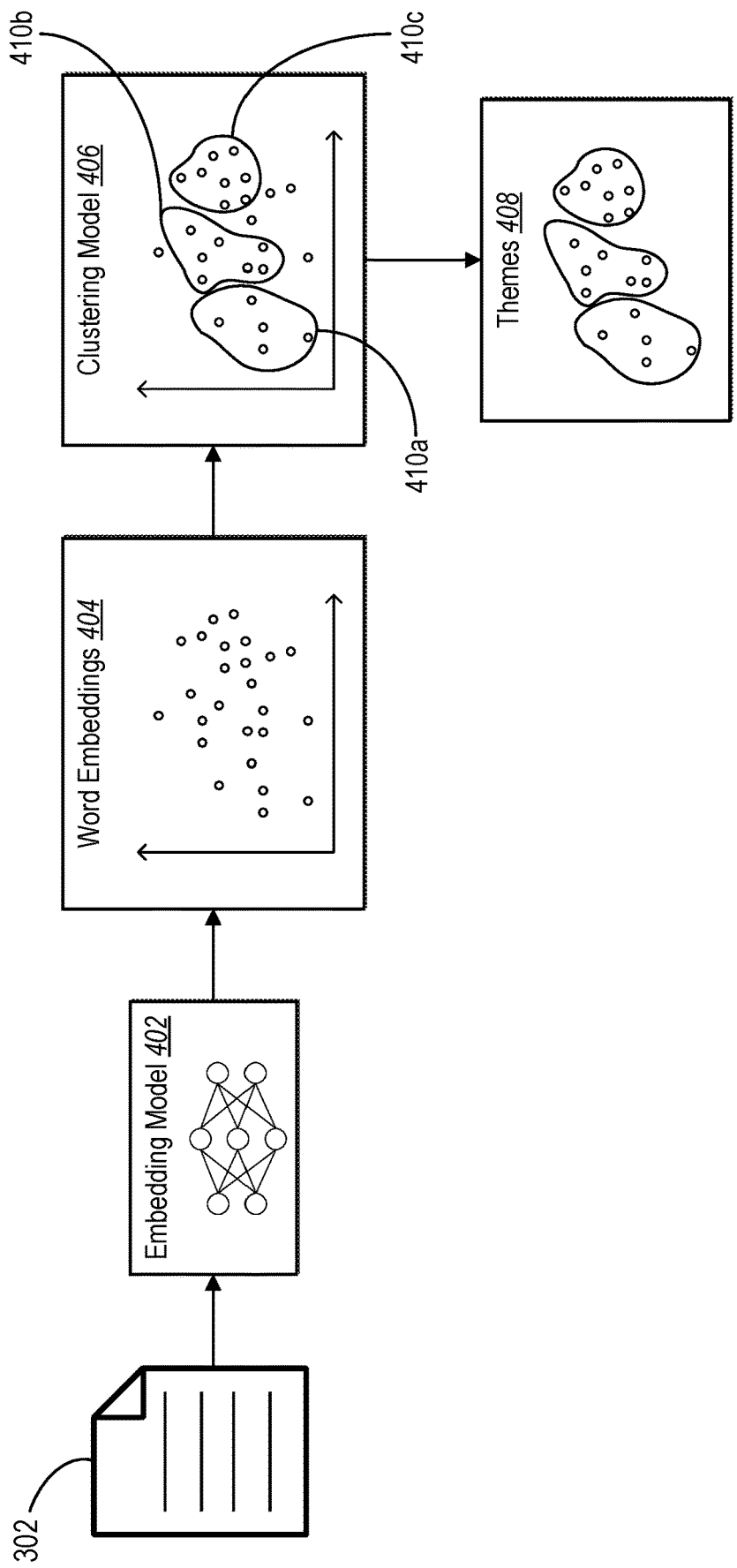
FIG. 4A illustrates a schematic diagram of utilizing a clustering model to determine themes of a digital document in accordance with one or more embodiments.
Figure 4B:
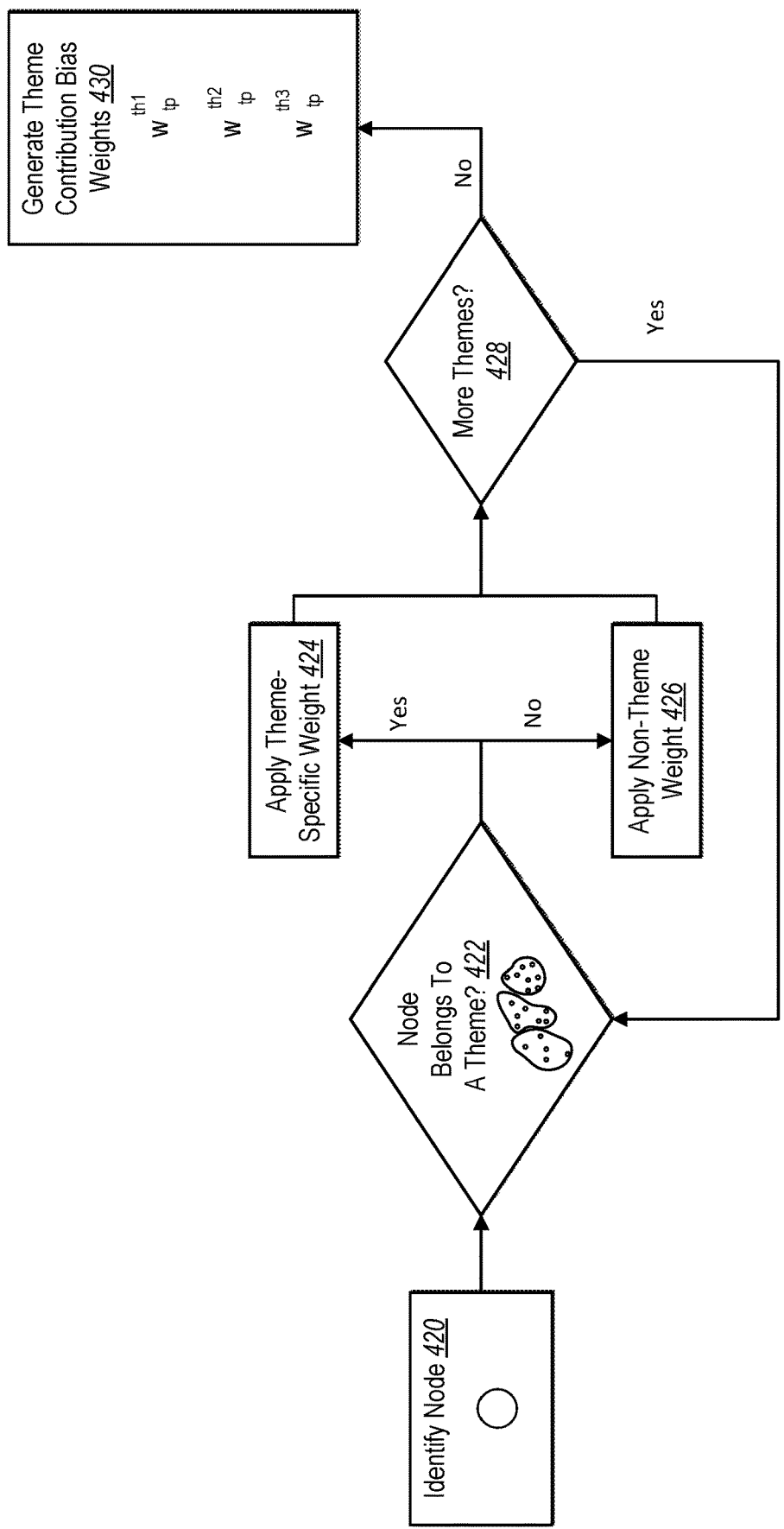
FIG. 4B illustrates a schematic diagram of determining theme contribution bias weights in accordance with one or more embodiments.
Figure 5:
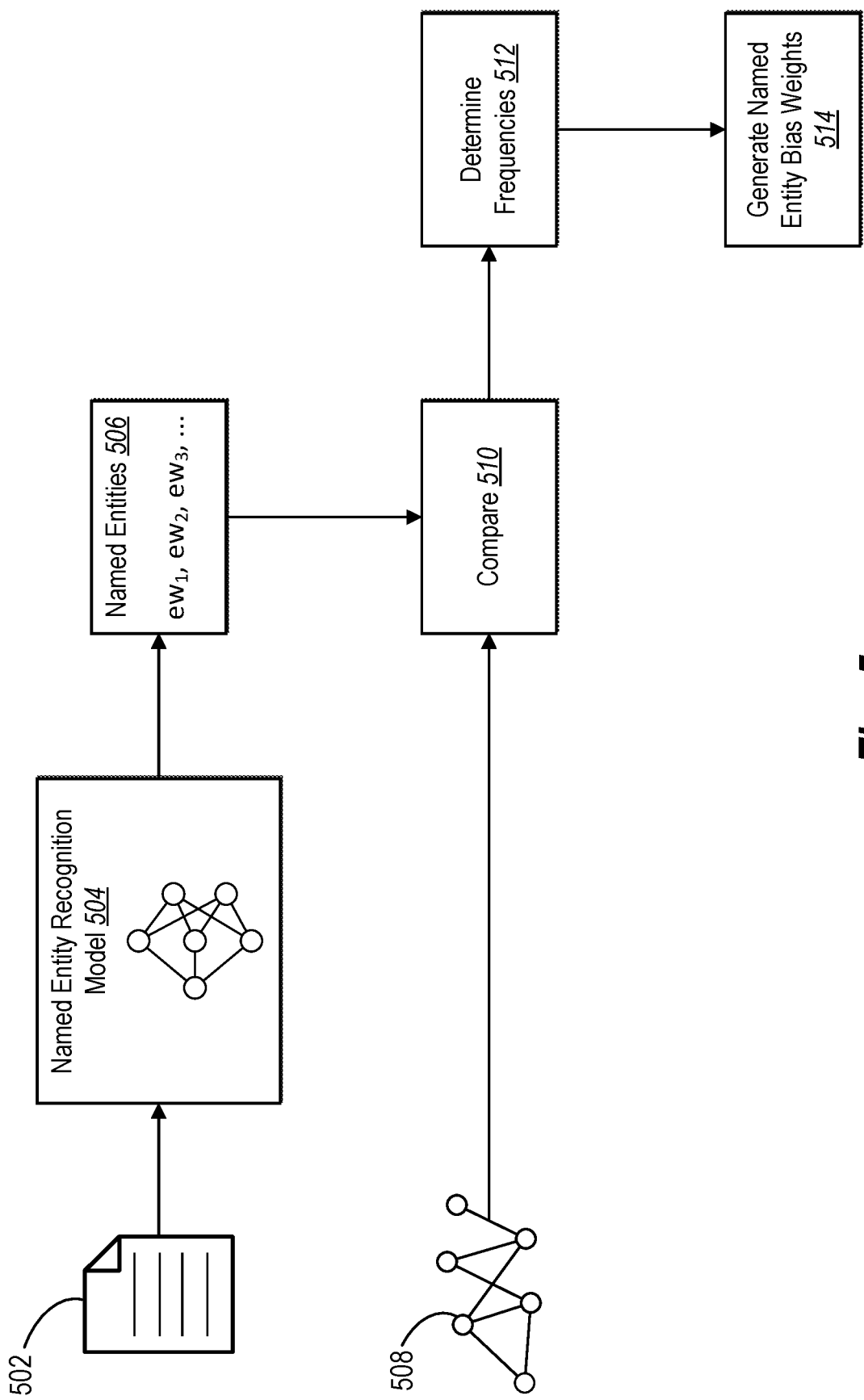
FIG. 5 illustrates a schematic diagram of generating named entity bias weights in accordance with one or more embodiments.
Figure 6:
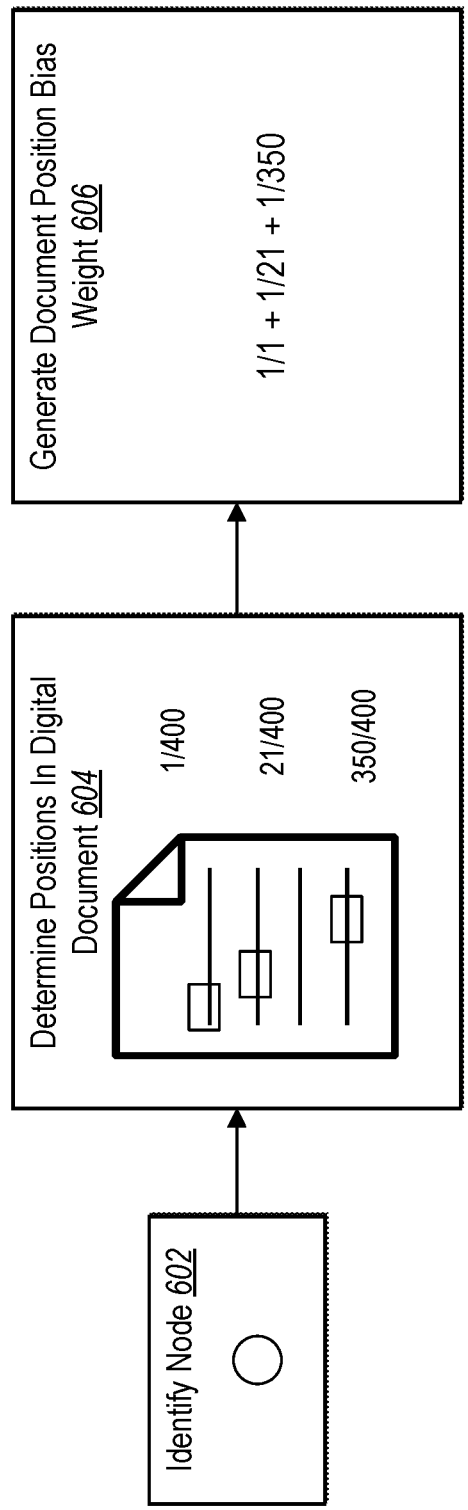
FIG. 6 illustrates a schematic diagram of generating document position bias weights in accordance with one or more embodiments.

As mentioned above, in one or more embodiments the keyphrase generation system 102 utilizes bias weights as priors to a machine learning model (such as random walk ranking model) to generate keyphrase summaries for a digital document. As shown in FIG. 2, the keyphrase generation system 102 analyzes the digital document 202 and generates the named entity bias weights 204, the document position bias weights 206, and the theme contribution bias weights 208. Each of these bias weights reflect contextual information regarding the relation between words within the digital document 202. Moreover, these bias weights emphasize these contextual features in the random walk to focus on words that more accurately reflect contents and themes of the digital document 202. Additional detail regarding each of these weights is provided below. For example, FIGS. 4A-4B provide additional detail in relation to generating theme contribution bias weights, FIG. 5 provides additional detail in relation to generating named entity bias weights, and FIG. 6 provides additional detail in relation to generating document position bias weights.

As shown, the keyphrase generation system 102 utilizes the graph 212 in conjunction with the machine learning model 210. The graph 212 can include a variety of data structures representing nodes and corresponding edges connecting the nodes. For example, in one or more embodiments the graph 212 is represented as a matrix or data table with cells representing edge strengths connecting nodes representing words. For instance, a node includes a digital representation of words within a digital document and edges include a digital representation of a connection between the nodes. In one or more implementations, the keyphrase generation system 102 generates the graph 212 by mapping words (e.g., word tokens and/or parts of speech) to nodes and determining edge strengths based on co-occurrence of the words within the digital document 202. Additional detail regarding generating a graph is provided below in relation to FIG. 3.

The keyphrase generation system 102 utilizes the machine learning model 210 to traverse the graph 212 with the bias weights to generate the keyphrase summary 214. The machine learning model 210 is a computer-implemented model that ranks words and/or keyphrases of a digital document. In particular, the machine learning model 210 can include a computer-implemented model that ranks words or phrases in a digital document based on a measure of relevance to a topic, theme, or purpose of a digital document. For example, a machine learning model 210 includes a computer-implemented model that utilizes a random walk process, (e.g., a stochastic or random process) that describes a path of succession of steps. Accordingly, in one or more implementations the random walk ranking model 210 includes a Markov chain (or Markov decision process) where the states are words and the transitions are the links between words (e.g., modeled by the number of co-occurrences between words in a digital document within a threshold word window).

The machine learning model 210 generates word scores for words/nodes of a graph. For example, the machine learning model 210 generates word scores reflecting a measure of relevance for words and/or nodes to a digital document. For example, word scores reflect a measure of network connectivity (or centrality) for nodes within a graph reflecting the digital document. To illustrate, in one or more implementations the machine learning model 210 utilizes the following formulation to generate a word score for each word/node in a graph:

$$S(A) = (1-d)/n + d\left(\frac{S(W_1)}{C(W_1)} + \ldots + \frac{S(W_n)}{C(W_n)}\right)$$

Where S(A) reflects a word score for word A, d is a damping factor (or restart probability), S(W) reflects a word score (e.g., word probability) for word W, C(W) reflects a (normalized) edge strength (e.g., a number of word co-occurrences between word A and word W). S(A) can be calculated using an iterative algorithm and corresponds to the principal eigenvector of the graph 212 (e.g., a normalized matrix of the document). This eigenvector represents the stationary probability distribution of each node/state. In particular, the above formulation models the probability distribution of transitioning from a first word in a first state to a second word in a second state (e.g., randomly walking between nodes). Although the foregoing representation illustrates the restart probability, d, as a constant, the restart probability can be modeled with individual restart probabilities at each node.

In one or more embodiments, the machine learning model 210 utilizes an algorithm, such as PageRank, as the random walk ranking model 210, as described by S. Brin and L. Page in "The anatomy of a large-scale hypertextual web search engine," Comput. Networks, vol. 30, no. 1-7, pp. 107-117 (1998), which is incorporated herein by reference in its entirety.

The machine learning model 210 can also include other machine learning approaches. For example, in one or more embodiments the machine learning model 210 includes a neural network, a decision tree, random forest algorithm, or other machine learning model.

As mentioned, in one or more implementations the keyphrase generation system 102 applies one, two, or more bias weights to the machine learning model 210 to emphasize contextual features from the document. In other words, by applying a bias weight the random walk emphasizes/prefers certain nodes in the graph. Accordingly, in the above formulation, the keyphrase generation system 102 applies a weight to each node that biases the probability of the random walk between nodes. For example, in one or more embodiments, the bias weight is applied as the reset probability, d, for each node. The weight w can be applied in a variety of ways (e.g., as a vector that modifies the reset probability and/or the node/edge representations within the foregoing equation). The bias weight biases the random walk to emphasize or de-emphasize certain nodes within the graph 212. As described in greater detail below (e.g., in relation to FIGS. 7 and 8), the keyphrase generation system 102 can determine the bias weight by combining the named entity bias weights 204, the document position bias weights 206, and/or the theme contribution bias weights 208 for each node in the graph 212.

As illustrated in FIG. 2, upon applying the machine learning model 210 to the graph 212 the keyphrase generation system 102 generates the keyphrase summary 214. The keyphrase summary 214 reflects one or more keyphrases corresponding to the digital document 202. For example, in relation to FIG. 2, the keyphrase summary 214 includes a first keyphrase 214a and a second keyphrase 214b extracted from the digital document 202. The keyphrase generation system 102 determines the first keyphrase 214a and the second keyphrase 214b based on a keyphrase ranking of candidate keyphrases (e.g., a ranking of possible keyphrases to select for the keyphrase summary 214).

Specifically, the keyphrase generation system 102 identifies word scores for words within a candidate keyphrase. The keyphrase generation system 102 then combines these word scores to generate a keyphrase score. The keyphrase generation system 102 generates a keyphrase ranking utilizing these keyphrase scores and surface particular keyphrases as part of the keyphrase summary 214 based on the keyphrase ranking. Additional detail regarding generating a keyphrase summary and keyphrase ranking is provided below (e.g., in relation to FIG. 8).

As shown in FIG. 2, the keyphrase generation system 102 provides the keyphrase summary 214 for display via a user interface of the client device 112. For example, the keyphrase generation system 102 determines a keyphrase (e.g., Civil War generals) and provide an indicator that the keyphrase reflects a topic, theme, or emphasize of the digital document 202 (e.g., "this document discusses Civil War generals').

Although FIG. 2 illustrates providing the keyphrase summary 214 for display, in some embodiments, the keyphrase generation system 102 utilizes the keyphrase summary 214 in other ways. For example, the keyphrase generation system 102 generates a keyphrase summary and associate the keyphrase summary with a digital document in a digital document repository. The keyphrase generation system 102 utilizes the keyphrase summary for other downstream tasks. For example, the keyphrase generation system 102 utilizes the keyphrase summary for cataloging the digital document. Similarly, the keyphrase generation system 102 utilizes the keyphrase summary to generate a query response. For example, the keyphrase generation system 102 provides the digital document 202 in response to a query from the client device 112 (e.g., a query for "Civil War"). Specifically, the keyphrase generation system 102 compares the query with the keyphrase summary 214 (e.g., performing a similarity analysis) and, based on this comparison, provide the digital document 202 to the client device 112.

As mentioned above, in one or more implementations the keyphrase generation system 102 generates a graph from a digital document. For example, FIG. 3 illustrates the keyphrase generation system 102 generating a graph 314 including nodes 316a-316b and edges 318a-318d from a digital document 302.

Figure 3:
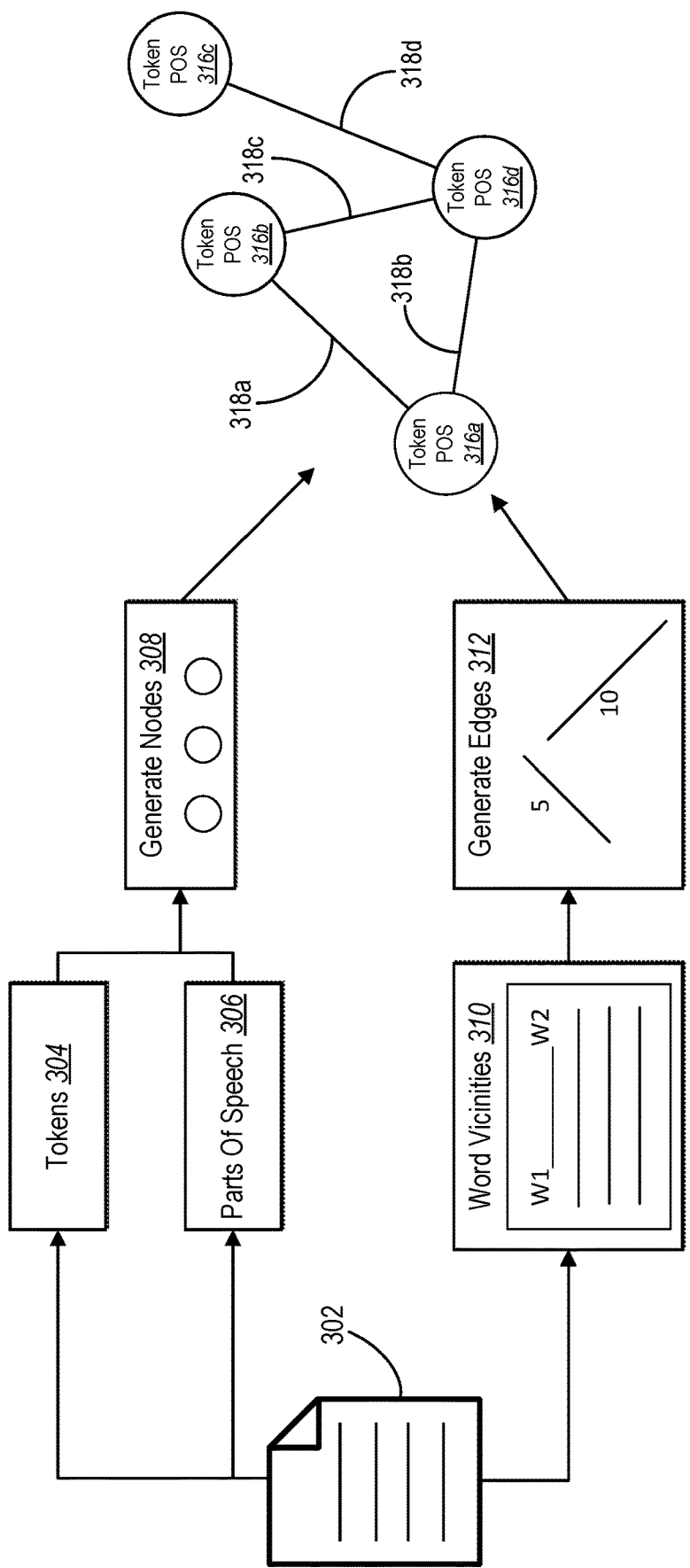
FIG. 3 illustrates a schematic diagram of the keyphrase generation system generating a graph of tokens and parts of speech from a digital document in accordance with one or more embodiments.

Specifically, FIG. 3 illustrates the keyphrase generation system 102 analyzing the digital document 302 to extract tokens 304. In particular, the keyphrase generation system 102 generates the tokens 304 utilizing a tokenizer model. For example, a tokenizer model can include a computer-implemented model that breaks raw text into smaller units, such as words or phrases. The keyphrase generation system 102 can utilize a variety of tokenizer models, such as the tokenizer as described by M. Honnibal, I. Montani, S. Van Landeghem, and A. Boyd in "spaCy: Industrial-strength Natural Language Processing in Python," (2020) (which is incorporated by reference herein in its entirety and hereafter referred to as spaCy) or HuggingFace as described by T. Wolf, L. Debut, V. Sanh, J. Chaumond, C. Delangue, A. Moi, P. Cistac, T. Rault, R. Louf, M. Funtowicz, and J. Brew in "Huggingface's transformers: State-of-the-art natural language processing," CoRR, vol. abs/1910.03771 (2019).

Moreover, as illustrated in FIG. 3, the keyphrase generation system 102 also analyzes the digital document 302 to determine parts of speech 306 corresponding to the tokens 304. In particular, the keyphrase generation system 102 utilizes a part of speech tagging model to determine parts of speech corresponding to words in the digital document 302. For example, a part of speech tagger can include a computer-implemented model that reads text and assigns parts of speech to each token, such as noun, verb, adjective, etc. Although the keyphrase generation system 102 can utilize a variety of tagger models, in some implementations the keyphrase generation system 102 utilizes the Stanford Log-linear Part-of-Speech Tagger.

Utilizing the tokens 304 and the parts of speech 306, the keyphrase generation system 102 also performs an act 308 of generating nodes. For example, the keyphrase generation system 102 defines rows/columns within a matrix or data table corresponding to token/part of speech combinations. Although FIG. 3 illustrates utilizing both the tokens 304 and the parts of speech 306, in some embodiments, the keyphrase generation system 102 utilizes only tokens, generates separate nodes for tokens and parts of speech, and/or utilizes alternate information for generating the nodes.

As illustrated in FIG. 3, the keyphrase generation system 102 also determines word vicinities 310 within the digital document 302. For example, determining word vicinities includes determining connections between words based on the vicinity within which those words occur in the digital document 302. To illustrate, the keyphrase generation system 102 determines the word vicinities 310 by determining word co-occurrences within the digital document 302 that fall within a threshold word window. For example, the keyphrase generation system 102 determines that two words fall within a particular vicinity by identifying that two words are used within a three word threshold window (and within the same sentence) within the digital document.

As shown, upon determining the word vicinities 310, the keyphrase generation system 102 performs an act 312 of generating edges. In particular, the keyphrase generation system 102 determines an edge value between nodes based on the word vicinities 310. To illustrate, if the keyphrase generation system 102 determines that two words co-occur within a threshold word window within the digital document on five different instances, the keyphrase generation system 102 generates an edge with an edge value of 5. In some embodiments, the keyphrase generation system 102 generates the edges by populating cells or entries of a matrix or data table that correspond to two words/tokens with a particular edge value (e.g., populating a cell that intersects a first token in a row and a second token in a column).

Accordingly, as shown in FIG. 3, the keyphrase generation system 102 generates a graph 314 that includes the nodes 316a-316d with corresponding edges 318a-318d.

Thus, for a given text document $\mathcal{D}$, a keyphrase kp can include a phrase of words that is representative of the key topics being discussed in $\mathcal{D}$. For defining relevance of a keyphrase kp for a given document $\mathcal{D}$, the keyphrase generation system 102 transforms $\mathcal{D}$ into a graph $\mathcal{G}$, in which the nodes are atomic units of $\mathcal{D}$ in the form of pairs of tokens and their parts of speech, of which only nouns, adjectives, and verbs are retained. Two nodes are connected if they cooccur in a small neighborhood. For example, in one or more embodiments, the keyphrase generation system 102 utilizes the following computer-implemented function to generate the graph:

```
function CONSTRUCTGRAPH(𝒟)
    Initialize empty graph 𝒢
    for token ∈ 𝒟 do
        if token ∉ stopwords And its POS ∈ {NOUN, ADJ, VERB} then
            Add the node {token.lower, POS} to 𝒢
        end if
    end for
    for node_i and node_j ∈ 𝒢 do
        if node_i and node_j are within a fixed window size in the same sentence then
            Create edge_ij with the weight of 1 Or increase its weight by 1 if it already
exists
        end if
    end for
    return 𝒢
end function
```

Accordingly, the keyphrase generation system 102 constructs a graph $\mathcal{G}$ of atomic units of $\mathcal{D}$, where an atomic unit is a unique pair of word surface form in lower case and its part of speech. In some implementations, $\mathcal{G}$ only contains atomic units corresponding to nouns, adjectives and verbs. Moreover, whenever two atomic units appear within a specified window of each other, the weight of the edge between them is incremented by 1. Thus, the keyphrase generation system 102 adopts modest and lightweight transformation of $\mathcal{D}$ to a word graph where the edges denote co-occurrence. As a result, this graph is closely related to the syntactic contents of the document $\mathcal{D}$.

As mentioned previously, in one or more embodiments, the keyphrase generation system 102 also extracts themes from a digital document in generating theme contribution bias weights. For example, FIG. 4A illustrates extracting themes 408 in accordance with one more embodiments. Moreover, FIG. 4B illustrates determining theme contribution bias weights in accordance with one or more embodiments.

As illustrated in FIG. 4A, the keyphrase generation system 102 utilizes an embedding model 402 to generate word embeddings 404. In particular, the keyphrase generation system 102 processes individual nodes/words from the digital document 302 to generate the word embeddings 404. The keyphrase generation system 102 can utilize a variety of embedding models to generate the word embeddings 404. For instance, the keyphrase generation system 102 can utilize machine learning models, such as neural networks, for the embedding model 402.

For example, a neural network includes a model of interconnected artificial neurons (e.g., organized in layers having learned parameters or weights) that communicate and learn to approximate complex functions. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

The keyphrase generation system 102 can utilize static embedding models or dynamic embedding models that take the context of the document D into account. To illustrate, in some embodiments, in implementing the embedding model 402 the keyphrase generation system 102 utilizes differently sizes spaCy language models (i.e., a static embedding model incorporated by reference above) or RoBERTa's base transformer model, a dynamic embedding model as described by Y. Liu, M. Ott, N. Goyal, J. Du, M. Joshi, D. Chen, O. Levy, M. Lewis, L. Zettlemoyer, and V. Stoyanov in "Roberta: A robustly optimized BERT pretraining approach," CoRR, vol. abs/1907.11692 (2019).

As illustrated in FIG. 4A, the keyphrase generation system 102 utilizes a clustering model 406 to generate the themes 408 from the word embeddings 404. In one or more embodiments, the keyphrase generation system 102 utilizes a Gaussian mixture clustering model to cluster the word embeddings. To illustrate, in one or more embodiments, the keyphrase generation system 102 utilizes a clustering model as described by S. Sia, A. Dalmia, and S. Mielke in *Tired of Topic Models? Clusters of Pretrained Word Embeddings Make for Fast and Good Topics too!*, Proceedings of the 2020 Conference on Empirical Methods in Natural Language Processing (EMNLP), Association for Computational Linguistics, pp. 1728-1736 (2020), which is incorporated reference herein in its entirety. The keyphrase generation system 102 can also utilize other clustering algorithms depending on the embodiment (e.g., k-means clustering).

In some implementations, the keyphrase generation system 102 utilizes a pre-determined number of clusters/themes. For example, the keyphrase generation system 102 extracts 3, 4, or 5 themes for a digital document by generating 3, 4, or 5 clusters. In relation to FIG. 4A, the keyphrase generation system 102 identifies three clusters 410a, 410b, and 410c. In some embodiments, the keyphrase generation system 102 dynamically varies the number of clusters based on the particular grouping or arrangement of the word embeddings 404.

Thus, as illustrated, the keyphrase generation system 102 generates themes 408 reflecting groups of word embeddings 404 corresponding to nodes/words from the graph 314 and the digital document 302. In particular, the keyphrase generation system 102 identifies the themes 408 utilizing the clusters 410a, 410b, and 410c. In one or more embodiments, the keyphrase generation system 102 utilizes the following computer implemented function to generate the themes 408:

```
function EXTRACTTHEMES(D, tl)
    emb_tl ← WordEmbedding(D, tl)
    Themes ← GaussianMixtureClustering(emb_tl)
    return Themes
end function
```

In the foregoing, tl is a list of nodes in $\mathcal{G}$. Moreover, Themes is a list of clusters of words, where each cluster is modeling a latent theme in the document $\mathcal{D}$. Accordingly, the keyphrase generation system 102 performs Gaussian mixture modeling for soft clustering atomic units into latent themes in $\mathcal{D}$.

As shown in FIG. 4B, the keyphrase generation system 102 utilizes identified themes to determine the theme contribution bias weights. In particular, FIG. 4B illustrates the keyphrase generation system 102 performing an act 420 of identifying a node (e.g., a particular node from the graph 314). The keyphrase generation system 102 performs an act 422 of determines if the node belongs to a theme. For example, the keyphrase generation system 102 accesses Themes as described in FIG. 4A and determines if the particular node falls within a cluster corresponding to a particular theme.

As illustrated, if the node belongs to a particular theme, the keyphrase generation system 102 performs an act 424 of applying a theme-specific weight. If the node does not belong to the theme, the keyphrase generation system 102 applies a non-theme weight. For example, in some embodiments, the keyphrase generation system 102 applies a theme-specific weight that is twice (or some other multiplier of) the non-theme weight.

In some implementations, the keyphrase generation system 102 applies theme-specific weight by adding a weighting factor to a non-theme weight. For instance, the keyphrase generation system 102 determines a non-theme weight that is normalized across the number of nodes in the graph. Moreover, the keyphrase generation system 102 determines a theme-specific weight by adding an additional weighting factor that is normalized across the number of nodes belonging to a theme. The keyphrase generation system 102 adds the additional weighting factor to the non-theme weight for any node belonging to the theme.

To illustrate, in one or more embodiments the keyphrase generation system 102 determines a non-theme weight as $$\text{weight} = \frac{1}{3} \cdot \frac{1}{\text{number of nodes in } \mathcal{G}}.$$

Moreover, the keyphrase generation system 102 determines the theme-specific weight as $$\text{theme word weight} = \frac{2}{3} \cdot \frac{1}{\|th_i\|} + \text{weight}.$$

The keyphrase generation system 102 can utilize various formulations for determining the non-theme weight 426 and the theme-specific weight 424 (e.g., a theme-specific weight that is a multiple of the non-theme weight or a theme-specific weight that is an exponential of the non-theme weight).

As shown in FIG. 4B, upon applying the theme-specific weight 424 or the non-theme weight 426, the keyphrase generation system 102 performs the act 428 and iterate to any additional themes identified in the digital document. For example, the keyphrase generation system 102 determines a first theme-specific weight for a first theme, and proceeds to a second theme and repeat the act 422 and applying the weights 424 and/or 426. For the second theme, the keyphrase generation system 102 determines whether the node belongs to the second theme and apply a second theme-specific weight or a non-theme specific weight.

The keyphrase generation system 102 can repeat this process for each theme identified in the digital document. Thus, for a digital document with three themes, the keyphrase generation system 102 determines a first weight (e.g., a first theme-specific weight or a first non-theme weight), a second weight (e.g., a second theme-specific weight or a second non-theme weight), and a third weight (e.g., a third theme-specific weight or a third non-theme weight). As shown in FIG. 4B, the keyphrase generation system 102 utilizes these weights to perform an act 430 of generating theme contribution bias weights. For example, the keyphrase generation system 102 utilizes the first weight for the first theme as a first theme contribution bias weight ($w_{tp}^{th_1}$), the second weight for the second theme as a second theme contribution bias weight ($w_{tp}^{th_2}$), and the third weight for the third theme as a third theme contribution bias weight ($w_{tp}^{th_3}$).

Although FIG. 4B illustrates maintaining separate theme contribution bias weights for separate themes, in some embodiments, the keyphrase generation system 102 combines the theme contribution bias weights (e.g., multiple or add the weights to generate a single theme contribution bias weight). In other embodiments, the keyphrase generation system 102 maintains separate theme contribution bias weights for further analysis (e.g., as discussed in greater detail below with regard to FIG. 7).

In addition, although FIG. 4B only illustrates identifying theme contribution bias weights for a single node, the keyphrase generation system 102 can iterate through the acts 420, 422, (applying the weights 424, 426) 428, and 430 for additional nodes. Indeed, in one or more embodiments, the keyphrase generation system 102 performs the process illustrated in FIG. 4B to generate theme contribution bias weights for each node in a graph.

Accordingly, the keyphrase generation system 102 can utilize the theme contribution bias weights to weigh the restart probability in favor of latent themes identified through Gaussian mixture modeling. This results in theme contribution bias weights, $w_{tp}^{th}\{w_{tp}^{th_i}=th_i \in \text{Themes}\}$, which denotes the bias profiles for each extracted theme $th_i$ from the document $\mathcal{D}$. For example, the keyphrase generation system 102 utilizes the following computer-implemented function to generate theme contribution bias weights:

```
function THEMEPERSONALIZATION(G, Themes, tl)
    w_tp^th ← { }
    weight ← 1/3 · 1/(number of nodes in G)
    for th_i ∈ Themes do
        w_tp^thi ← { }
        theme word weight ← 2/3 · 1/||th_i|| + weight
        for node ∈ G do
            if node ∈ th_i then
                w_tp^thi [node] ∝ theme word weight
```

```
        else
            w_tp^{thi}[node] ∝ weight
        end if
    end for
    w_tp^{th} ← w_tp^{thi}
    end for
    return w_tp^{th}
end function
```

As mentioned above, in one or more embodiments the keyphrase generation system 102 also determines named entity bias weights. For example, FIG. 5 illustrates generating named entity bias weights from a digital document 502 in accordance with one or more embodiments.

In particular, as illustrated in FIG. 5, the keyphrase generation system 102 utilizes a named entity recognition model 504 to generate named entities 506. The named entity recognition model 504 can include a variety of computer-implemented models that extract or identify named entities from digital text. For example, a named entity recognition model can locate and classify named entities into classes or categories, such as person names, geopolitical entities, locations organizations, facilities (e.g., building, airport, highway), products, events, works of art, laws (e.g., bills, statutes, etc.), or languages. In some embodiments, the keyphrase generation system 102 also includes languages, countries, nationalities, money, quantities, or time. Thus, named entities can include proper nouns identifying persons, places, or things or time expressions, monetary values, etc. To illustrate, in the sentence, "Jake purchased a bike from Big Box Store," the named entity recognition model 504 can tag or highlight the named entities as follows: Jake (named entity: person) purchased a bike from Big Box Store (named entity: organization).

The keyphrase generation system 102 can utilize a variety of model architectures or formulations for the named entity recognition model 504. In some embodiments, the keyphrase generation system 102 utilizes linguistic grammar-based techniques, statistical models, and/or machine learning models. For example, the keyphrase generation system 102 utilizes spaCy, OpenNLP, or GATE as the named entity recognition model 504.

As illustrated in FIG. 5, upon identifying the named entities 506, the keyphrase generation system 102 performs an act 510 of comparing the named entities 506 with nodes/words of a graph 508 (e.g., the graph 314). In particular, the keyphrase generation system 102 can determine the nodes/words from the graph 508 that appear in the named entities 506. Thus, for example, the keyphrase generation system 102 can determine that a node comprising a token for "big" is utilized in the named entity "Big Box Store." Indeed, at the act 512, the keyphrase generation system 102 can determine frequencies with which words/nodes appear within the named entities 506. Thus, for example, the keyphrase generation system 102 can determine that the word "big" is utilized a certain number of instances (e.g., 10) within the named entities 506 identified within the digital document 502. Similarly, the keyphrase generation system 102 can determine that the word "store" is utilized a certain number of instances (e.g., 20) within the named entities 506 identified within the digital document 502.

As shown in FIG. 5, the keyphrase generation system 102 utilizes the frequencies in an act 514 to generate named entity bias weights. For example, the keyphrase generation system 102 determines named entity bias weights as the log (or natural log, exponent, or some other operand) of the frequencies of nodes that belong to named entities. Accordingly, the keyphrase generation system 102 utilizes frequencies with which the words corresponding to the nodes appear within named entities to determine the named entity bias weight.

Thus, consider a collection ew of all words in $\mathcal{D}$ which belong to an entity phrase. As mentioned above, a named entity recognizer is utilized for tagging tokens as named entities. For any given token in $\mathcal{D}$, token.lower corresponds to the surface form of the token in lower case. Accordingly, the keyphrase generation system 102 can extract entity words according to the following computer-implemented function:

```
function EXTRACTENTITYWORDS(𝒟)
    entities ← NamedEntityRecognizer(𝒟)
    Return {w.lower, ∀w ∈ entity, ∀entity ∈ entities}
end function
```

Upon extracting entity words (utilizing the foregoing function), the keyphrase generation system 102 can also generate named entity bias weights, $w_{ep}$, according to the following computer-implemented functions:

```
function ENTITYPERSONALIZATION(ew, tl)
    w_ep ← { }
    for (token, POS) ∈ tl do
        w_ep[(token, POS)] ∝ 1 + ln(1 + Σ_i ⟦tl_i.text.lower = token.lower&token.lower ∈ ew⟧)
    end for
    return w_ep
end function
```

As mentioned, in one or more embodiments the keyphrase generation system 102 utilizes the named entity bias weights to emphasize the importance of named entities whose relevance is not perceived otherwise explicitly through syntax. Accordingly, the keyphrase generation system 102 imposes a bias in favor of atomic units that belong to a named entity phrase in $\mathcal{D}$ as the logarithm of the frequency of appearance of the atomic unit in a named entity. These priors (i.e., the named entity bias weights) are denoted by the weight vector $w_{ep}$.

As mentioned previously, in some implementations the keyphrase generation system 102 generates document position bias weights. For example, FIG. 6 illustrates generating a document position bias weight for a node in accordance with one or more embodiments. In particular, FIG. 6 illustrates the keyphrase generation system 102 performing an act 602 of identifying a node (e.g., a node/word from the graph 314 and the digital document 302). For this node, the keyphrase generation system 102 performs an act 604 of determining positions in a digital document (e.g., the digital document 302).

For example, the keyphrase generation system 102 determines positions in the digital document relative to a beginning of the digital document (e.g., a first word, an initial character, or an initial heading of a digital document). Indeed, as shown in FIG. 6, the keyphrase generation system 102 determines that a word corresponding to the node appears as the first word in the digital document, the twenty-first word of the digital document, and the three-hundred-fiftieth word in the digital document. Thus, the keyphrase generation system 102 determines a word distance from the beginning of the document for each instance that the word is utilized in the digital document.

As shown, the keyphrase generation system 102 also performs an act 606 of generating a document position bias weight. In particular, the keyphrase generation system 102 generates the document position bias weight based on the positions of the word in the digital document. In relation to the embodiment of FIG. 6, the keyphrase generation system 102 determines the document position bias weight by summing the reciprocal (or multiplicative inverse) of the positions of the digital document. Thus, as illustrated, the keyphrase generation system 102 determines the document position bias weight as 1/1+1/21+1/350. In this manner, the keyphrase generation system 102 emphasizes utilization of terms at the beginning of a document.

The keyphrase generation system 102 can iteratively perform the process illustrated in FIG. 6 for other nodes. Indeed, in some embodiments, the keyphrase generation system 102 determines a document position bias weight for each node in the graph.

For example, in some implementations, the keyphrase generation system 102 determines document position bias weights, $w_{pp}$, by utilizing the following computer-implemented function:

```
function POSITIONPERSONALIZATION(𝒟, tl)
    w_pp ← { }
    for (token, POS) ∈ tl do
        w_pp [(token, POS)] ∝ Σ_i 1/i, where i is the position of nodes (token, POS) in D
    end for
    return w_pp
end function
```

The keyphrase generation system 102 thus biases the random walk in favor of units appearing early on in the document.

Utilizing the approach described in FIGS. 4A-6, the keyphrase generation system 102 determines bias weights. Moreover, the keyphrase generation system 102 utilizes the bias weights to bias a random walk ranking algorithm. Indeed, the keyphrase generation system 102 utilizes the bias weights as restart probabilities in performing a random walk. Accordingly, in one or more embodiments, the keyphrase generation system 102 utilizes the following computer-implemented function to determine bias weights that are utilized to determine restart probabilities (e.g., within a PageRank random walk ranking algorithm):

```
function PAGERANKRESTARTPROBABILITY(𝒟, ew, 𝒢, tl, Themes)
    w_pp ← POSITIONPERSONALIZATION(𝒟, tl)
    w_ep ← ENTITYPERSONALIZATION(ew, tl)
    w_tp^th ← THEMEPERSONALIZATION(𝒢, Themes, tl)
    return w_pp, w_ep, w_tp^th
end function
```

Figure 7:
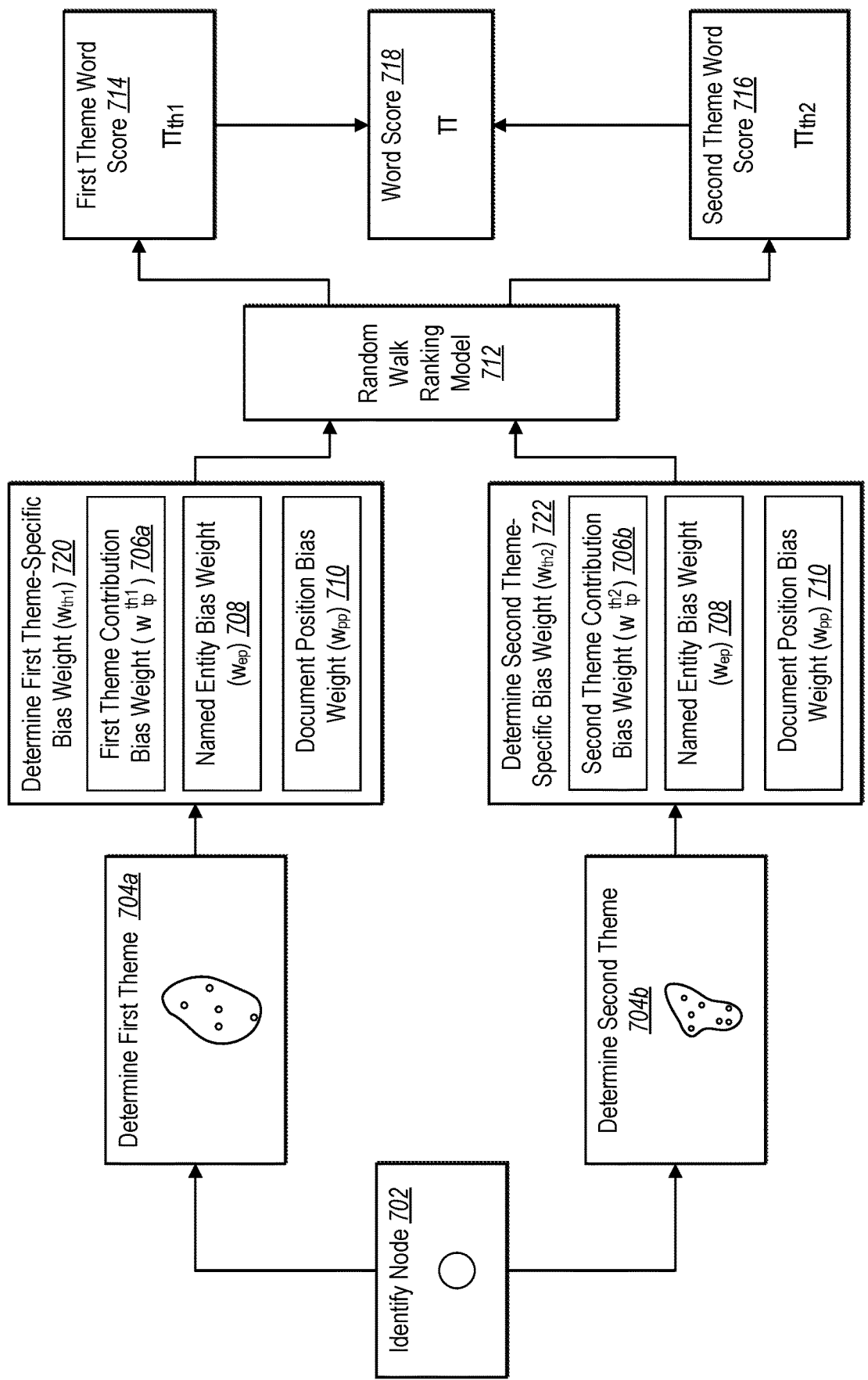
FIG. 7 illustrates a schematic diagram of generating a word score for a node from a graph by combining multiple theme contribution bias weights in accordance with one or more embodiments.

As mentioned above, in one or more implementations the keyphrase generation system 102 combines various bias weights and utilize the bias weights in conjunction with a random walk ranking model to generate word scores. For example, FIG. 7 illustrates the keyphrase generation system 102 generating a word score for a node in accordance with one or more embodiments.

As shown, the keyphrase generation system 102 performs an act 702 of identifying a node (e.g., from the graph 314). The keyphrase generation system 102 also performs an acts 704a of determining a first theme and an act 704b of identifying a second theme (e.g., as described above in relation to FIG. 4A). Although FIG. 7 illustrates a first theme and a second theme, the keyphrase generation system 102 can also determine additional themes (e.g., a third theme or a fourth theme).

As mentioned above (e.g., with regard to FIG. 4B), the keyphrase generation system 102 also determines different theme contribution bias weights for the first theme and the second theme. As illustrated, the keyphrase generation system 102 determines a first theme contribution bias weight 706a (corresponding to the first theme) and a second theme contribution bias weight 706b (corresponding to the second theme). Moreover, as mentioned above (with regard to FIGS. 5 and 6), the keyphrase generation system 102 also determines a named entity bias weight 708 and a document position bias weight 710 for the identified node.

As illustrated, the keyphrase generation system 102 utilizes these weights to perform an act 720 of determining a first theme-specific bias weight and an act 722 of determining a second theme-specific bias weight. In particular, the keyphrase generation system 102 performs the act 720 by combining the first theme contribution bias weight 706a, the named entity bias weight 708, and the document position bias weight 710. Similarly, the keyphrase generation system 102 can perform the act 722 by combining the second theme contribution bias weight 706b, the named entity bias weight 708, and the document position bias weight 710. Accordingly, the first theme-specific bias weight reflects a combined bias weight (reflecting first theme contribution, named entity, and document position bias) specific to the first theme. Moreover, the second theme-specific bias weight reflects a combined bias weight specific to the second theme.

As shown in FIG. 7, the keyphrase generation system 102 can utilize a random walk ranking model 712 (e.g., the machine learning model 210) in conjunction with a graph (not shown) to generate word scores. In particular, in the embodiment shown in FIG. 7, the keyphrase generation system 102 generates a first theme word score 714 (for the first theme-specific bias weight) and a second theme word score 716 (for the second theme-specific bias weight).

The keyphrase generation system 102 generates the first theme word score by utilizing the first theme-specific bias weight to bias the random walk ranking model 712. For example, the keyphrase generation system 102 utilizes the first theme-specific bias weight to modify the reset probability within the random walk ranking model 712. The random walk ranking model 712 performs a random walk of the graph comprising the identified node biased according to the first theme-specific bias weight and generates the first theme word score 714.

Similarly, upon generating the first theme word score 714, the keyphrase generation system 102 utilizes the second theme-specific bias weight to bias the random walk ranking model 712 (e.g., in place of the first theme-specific bias weight). For example, the keyphrase generation system 102 utilizes the second theme-specific bias weight to modify the reset probability within the random walk ranking model 712. The keyphrase generation system 102 then utilizes the random walk ranking model 712 to perform a random walk of the graph biased according to the second theme-specific bias weight to generate the second theme word score 716.

Accordingly, the first theme word score 714 and the second theme word score 716 reflect the relevance of the identified node based on contribution to a particular theme, utilization within named entities, and document position. Moreover, as illustrated, the keyphrase generation system 102 combines the first theme word score 714 and the second theme word score 716 to generate a word score 718. For example, in one or more embodiments, the keyphrase generation system 102 combines the first theme word score 714 and the second theme word score 716 by averaging (or by some other operand, such as adding or multiplying). Accordingly, the word score 718 reflects the combined relevance of the identified node with regard to the first theme and the second theme as well as utilization within named entities and the word position of the node within the digital document.

Although FIG. 7 illustrates generating a word score for a particular node with reference to two theme-specific bias weights, it will be appreciated that the keyphrase generation system 102 can perform the process illustrated in FIG. 7 with regard to a plurality of nodes (e.g., all nodes in a graph) and their corresponding theme-specific bias weights. For instance, in one or more implementations the keyphrase generation system 102 determines a plurality of first theme-specific bias weights for the nodes of a graph. Similarly, the keyphrase generation system 102 can determine a plurality of second theme-specific bias weights for the nodes of a graph. Indeed, the keyphrase generation system 102 generates a transition probability matrix (comprising a plurality of theme-specific bias weights) for each theme.

Utilizing these transition probability matrices, the keyphrase generation system 102 generates theme word scores. For example, the keyphrase generation system 102 generates a plurality of first theme word scores for the nodes (for the first theme). Similarly, the keyphrase generation system 102 generates a plurality of second theme word scores for the nodes (for the second theme). The keyphrase generation system 102 generates a plurality of word scores for the nodes by combining the plurality of first theme word scores and the plurality of second theme word scores.

Moreover, although FIG. 7 illustrates a particular approach to generating a word score, in one or more implementations the keyphrase generation system 102 utilizes alternative approaches. For example, in some embodiments, rather than generating a first theme-specific bias weight, a second theme-specific bias weight, a first theme word score, and a second theme word score, the keyphrase generation system 102 combines the first theme contribution bias weight and the second theme contribution bias weight up front (e.g., before implementing the random walk ranking model 712).

To illustrate, the keyphrase generation system 102 combines the first theme contribution bias weight 706a and the second theme contribution bias weight 706b for the identified node to generate a combined theme contribution bias weight. The keyphrase generation system 102 determines an overall bias weight by combining the combined theme contribution bias weight, the named entity bias weight 708, and the document position bias weight 710. The keyphrase generation system 102 utilizes this overall bias weight to bias the random walk ranking model 712 and generate the word score 718. The keyphrase generation system 102 can perform this process for the nodes of a graph (e.g., generate overall bias weights for the nodes and then generate word scores for the nodes).

Also, in some embodiments, the keyphrase generation system 102 modifies the approach for calculating word scores, depending on the number of nodes in the graph. For example, where the number of nodes in the graph is less than a threshold (e.g., 200), the keyphrase generation system 102 computes the exact word scores (e.g., PageRank scores); otherwise, the keyphrase generation system 102 uses power iterations.

Thus, the keyphrase generation system 102 can generate a carefully designed transition probability matrix for each theme, that not only takes into account the co-occurrence information available in $\mathcal{D}$, but also incorporates more meaningful prior information about the position and other semantic properties. The keyphrase generation system 102 can then perform a random walk once for each theme $th_i \in$ Themes to compute the PageRank $\pi$[node] (i.e., the word score) for each node in $\mathcal{G}$. For example, the keyphrase generation system 102 can utilize the following computer-implemented function to determine word scores for nodes, where $w_{th_i}$ reflects the theme-specific bias weights and $\pi_{th_i}$ reflects theme word scores discussed above:

```
function COMPUTEPAGERANK(w_pp, w_ep, w_tp^th, G, Themes)
    π ← { }
    for th_i ∈ Themes do
        w_{th_i} ← { }
        for node ∈ th_i do
            w_{th_i}[node] ∝ w_pp(node) · w_ep(node) · w_tp^{thi}(node)
        end for
        Normalize w_{th_i}
        Compute the PageRank scores π_{th_i} for G with w_{th_i} as the restart
        probability
    end for π[node] ← (1 / number of Themes) Σ_{th_i} π_{th_i}[node], ∀ node ∈ G return π
end function
```

In the foregoing example, $\pi$ is a vector in the probability simplex, that denotes the aggregated word values (e.g., PageRank values) obtained for each node.

As described, the keyphrase generation system 102 can thus utilize a graph and random walk ranking model to determine word scores utilizing a variety of different function. For example, the keyphrase generation system 102 can utilize following computer-implemented Algorithm 1 to generate word scores using the various functions described above:

Algorithm 1

```
Input Text document D
Output A list of keyphrases, texts, scores, and spans.
ew ← EXTRACTENTITYWORDS(D)
G ← CONSTRUCTGRAPH(D)
tl ← {(token, lower, POS), ∀(token.lower, POS) ∈ G}
Themes ← EXTRACTTHEMES(D, tl)
w_pp, w_ep, w_tp^th ← PAGERANKRESTARTPROBABILITY(D, ew, G, tl, Themes)
π ← COMPUTEPAGERANK(w_pp, w_ep, w_tp^th, G, Themes)
```

Figure 8:
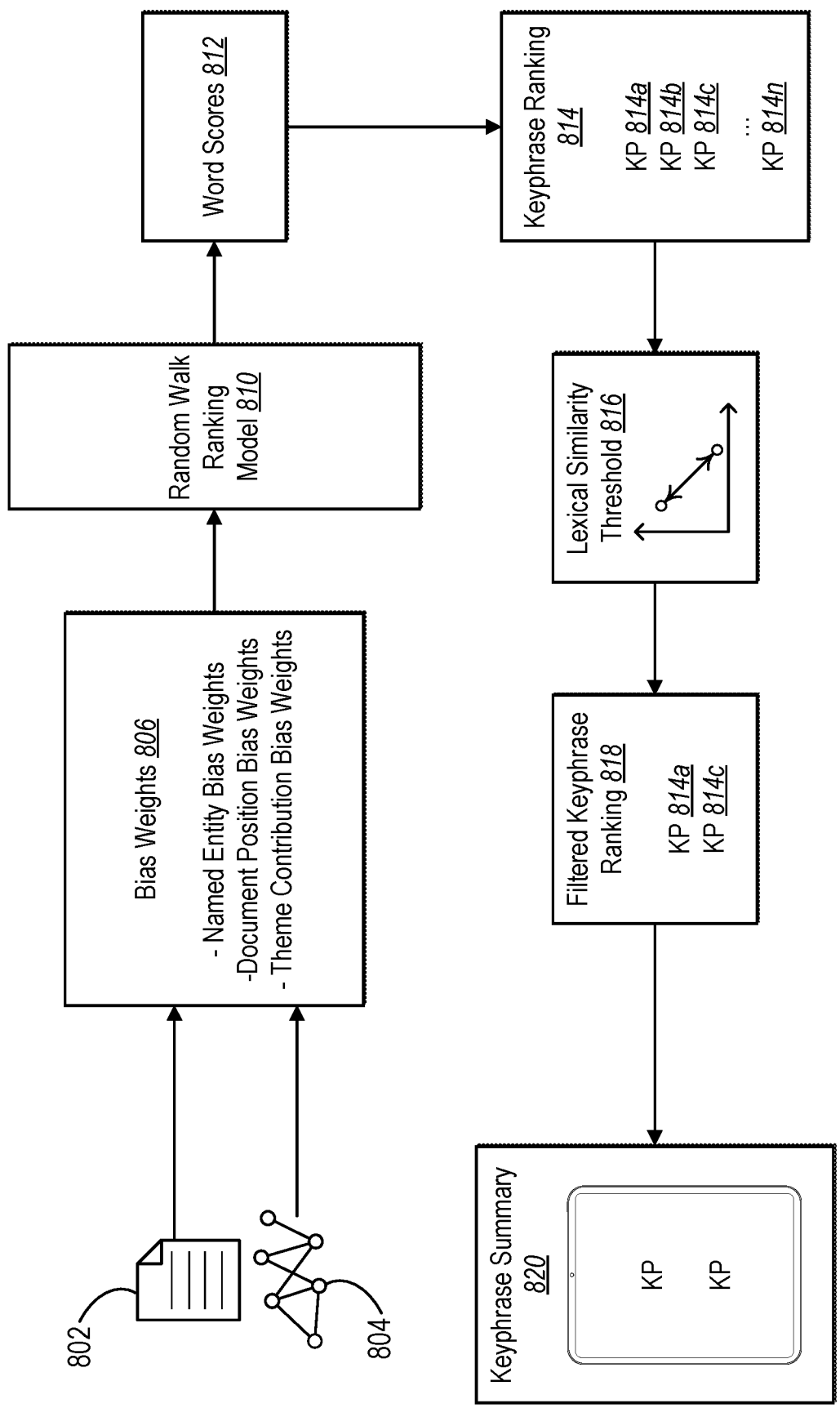
FIG. 8 illustrates a schematic diagram of utilizing a machine learning model to determine word rankings and keyphrase rankings and generating a keyphrase summary in accordance with one or more embodiments.

As mentioned above, the keyphrase generation system 102 can utilize word scores to determine keyphrase rankings and generate keyphrase summaries. FIG. 8 illustrates utilizing word scores 812 to generate a keyphrase summary 820 in accordance with one or more embodiments.

As illustrated, the keyphrase generation system 102 generates a graph 804 from a digital document 802 (e.g., as described above in relation to FIG. 3). Moreover, the keyphrase generation system 102 determines bias weights 806 (e.g., as described above in relation to FIGS. 4A-6). The keyphrase generation system 102 utilizes the bias weights 806 with the random walk ranking model 810 (and the graph 804) to determine word scores 812 (e.g., as described above in relation to FIG. 7). The keyphrase generation system 102 then utilizes the word scores 812 to determine a keyphrase ranking 814.

To determine the keyphrase ranking 814, the keyphrase generation system 102 determines keyphrase scores for individual keyphrases and then ranks the keyphrases according to the keyphrase scores. Because keyphrases can include multiple words or phrases, the keyphrase generation system 102 can determine keyphrase scores from the word scores 812. In particular, the keyphrase generation system 102 can filter and refine candidate keyphrases, identify words/nodes making up the candidate keyphrases, and then determine keyphrase scores by combining word scores.

For example, the keyphrase generation system 102 extracts candidate keyphrases (e.g., noun chunks, entities, phrases) from the digital document 802. For each candidate phrase (e.g., noun chunk, nc), the keyphrase generation system 102 removes tokens from the front to accommodate a threshold phrase length L. For example, the keyphrase generation system 102 can generate a new noun chunk, nc' (e.g., a condensed candidate keyphrase).

The keyphrase generation system 102 can also filter nc' by removing tokens from the front so that the first token is not a stopword, not a line enumeration, not a Roman numeral, etc. The keyphrase generation system 102 can also remove words that are certain parts of speech such as an interjection, auxiliary, coordinating conjunction, adposition, determiner, numeral, particle, pronoun, subordinating conjunction, punctuation, symbol, or other (e.g., POS∉{INTJ, AUX, CCONJ, ADP, DET, NUM, PART, PRON, SCONJ, PUNCT, SYM, X}). The keyphrase generation system 102 can also filter by removing tokens from the end for satisfying one or more criteria. For example, the keyphrase generation system 102 can remove tokens that are not stopwords, Roman numerals, and certain parts of speech, etc. The keyphrase generation system 102 can thus generate a further revised noun chunk, nc" (e.g., a filtered candidate keyphrase). Similarly, for a named entity, ent, the keyphrase generation system 102 can apply similar filtering steps (as for noun chunks above). In some embodiments, the keyphrase generation system 102 does not apply a threshold phrase length L for entity phrases.

As mentioned above, upon filtering and preparing candidate keyphrases, the keyphrase generation system 102 can also determine keyphrase scores from word scores. For example, the keyphrase generation system 102 can determine a keyphrase score by averaging the word scores of words within the candidate keyphrase. To illustrate, in one or more embodiments, the keyphrase generation system 102 utilizes the following formulation for determining keyphrase scores:

$$\text{keyphrase score } (c) = \frac{\sum_{token \in c} \pi\{(token.lower, POS)\}}{\text{number of tokens in } c}$$

In one or more implementations, the keyphrase generation system 102 groups candidate keyphrases by their text and collects all the spans for each unique text along with the keyphrase score. In this manner, the keyphrase generation system 102 generates a list of key phrases. For example, the list of keyphrases can include a format of (text, score) and corresponding spans. The keyphrase generation system 102 can retain the span that corresponds to the first occurrence as an entity, if not then the first occurrence as a noun chunk. The keyphrase generation system 102 can then generate the keyphrase ranking 814 by sorting the candidate phrases by keyphrase score. Specifically, the keyphrase generation system 102 can generate a list of keyphrases, e.g., (text, score), sorted in (descending) order of score.

As illustrated in FIG. 8, the keyphrase generation system 102 can also apply a lexical similarity threshold 816. In particular, because an important word will often appear in multiple noun phrases, the keyphrase generation system 102 can generate multiple syntactically similar keyphrases with high ranking. This can result in identifying keyphrases that are similar, while omitting diverse topics. Accordingly, the keyphrase generation system 102 can impose diversity on the keyphrase ranking 814 to generate a filtered keyphrase ranking 818.

For example, the keyphrase generation system 102 can determine a lexical similarity (or distance) between two keyphrases. The keyphrase generation system 102 can compare this lexical similarity to the lexical similarity threshold 816. If the lexical similarity (or distance) indicates that the words are too similar, the keyphrase generation system 102 can remove one of the candidate keyphrases from the filtered keyphrase ranking 818. If the lexical similarity (or distance) indicates that the words are sufficiently distinct, the keyphrase generation system 102 can include the candidate keyphrase in the filtered keyphrase ranking 818.

The keyphrase generation system 102 can utilize a lexical similarity threshold in a variety of forms. For example, the keyphrase generation system 102 can map keyphrases to a lexical feature space and compare distances between keyphrases within this lexical feature space. In some embodiments, for example, the keyphrase generation system 102 utilizes a Levenshtein distance as the lexical similarity threshold 816.

Thus, as shown in FIG. 8, the keyphrase generation system 102 identifies candidate keyphrases 814*a*-814*n*. The keyphrase generation system 102 applies a lexical similarity threshold 816. Specifically, the keyphrase generation system 102 determines the lexical similarity of the keyphrase 814*a* and the keyphrase 814*b*. The keyphrase generation system 102 determines that the keyphrase 814*a* and the keyphrase 814*b* have a lexical similarity that is closer than the lexical similarity threshold 816 (e.g., the Levenshtein distance between the keyphrase 814*a* and the keyphrase 814*b* is smaller than the threshold Levenshtein distance). Accordingly, the keyphrase generation system 102 removes the keyphrase 814*b* in generating the filtered keyphrase ranking 818. The keyphrase generation system 102 can repeat this process by comparing keyphrase pairs to generate the filtered keyphrase ranking 818.

Thus, in one or more embodiments, the keyphrase generation system 102 imposes diversity by iterating over candidate keyphrases (e.g., noun chunks). The keyphrase generation system 102 includes a keyphrase if it is not more than a threshold similar to the phrases in the current list. In some embodiments, the keyphrase generation system 102 does not impose diversity on named entities.

As shown in FIG. 8, upon generating the filtered keyphrase ranking 818, the keyphrase generation system 102 can generate the keyphrase summary 820. In particular, the keyphrase generation system 102 can select keyphrases from the filtered keyphrase ranking 818. For example, the keyphrase generation system 102 can select a top percentage (e.g., top 10%) or a top number (e.g., top two) of candidate keyphrases from the filtered keyphrase ranking 818. In some embodiments, the keyphrase generation system 102 can utilize all of the keyphrases from the filtered keyphrase ranking 818.

As discussed above, the keyphrase generation system 102 can generate keyphrase summary 820 in a variety of forms. For example, as shown, the keyphrase summary 820 can include a visual representation of selected keyphrases provided, for display, via a user interface of a client device. The keyphrase summary 820 can also include generating a metadata tag (or other tag) identifying selected keyphrases and associating the keyphrases with the digital document 802. Thus, the keyphrase summary 820 can be utilized to catalog, identify, and/or retrieve the digital document 802.

Figure 9:
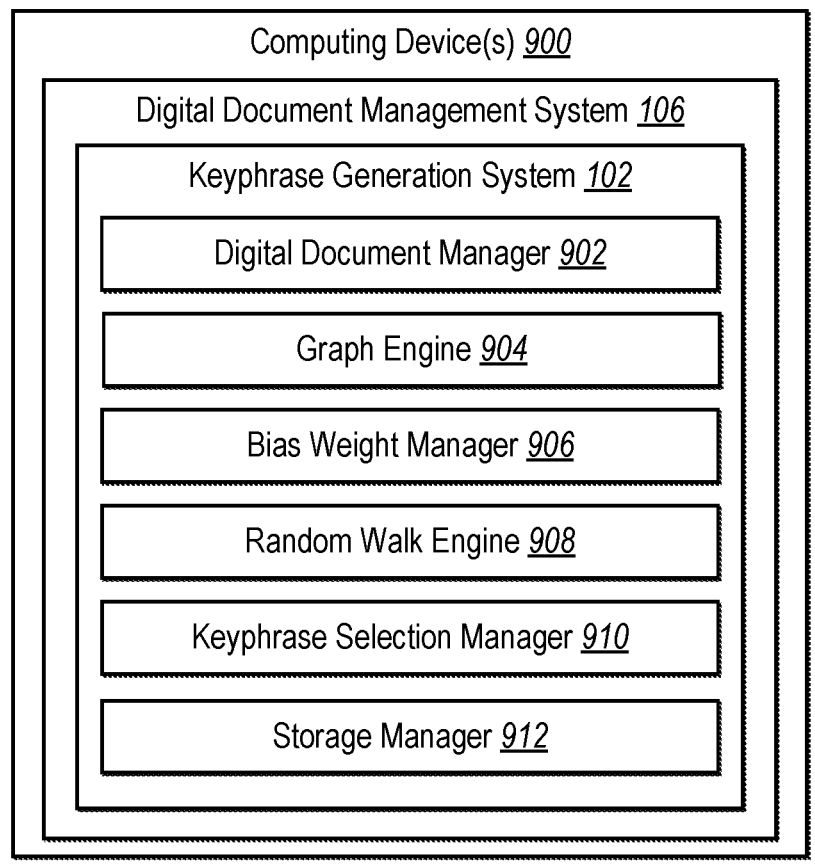
FIG. 9 illustrates a schematic diagram of a keyphrase generation system in accordance with one or more embodiments.

Looking now to FIG. 9, additional detail will be provided regarding components and capabilities of the keyphrase generation system 102. Specifically, FIG. 9 illustrates an example schematic diagram of the keyphrase generation system 102 on an example computing device 900 (e.g., one or more of the client device 112 and/or the server(s) 104). As shown in FIG. 9, the keyphrase generation system 102 includes a digital document manager 902, a graph engine 904, a bias weight manager 906, a random walk engine 908, a keyphrase selection manager 910, and a storage manager 912.

As just mentioned, the keyphrase generation system 102 includes the digital document manager 902. The digital document manager 902 can collect, identify, retrieve, and/or modify digital documents. For example, the digital document manager 902 can identify digital documents from the Internet, a database, or individual client devices.

As shown in FIG. 9, the keyphrase generation system 102 also includes the graph engine 904. The graph engine 904 can create, generate, and utilize graphs for digital documents. For example, as discussed above, the graph engine 904 can generate a graph representation from a digital document by mapping words to nodes and determining edge weights based on word co-occurrence within the digital document.

As further illustrated in FIG. 9, the keyphrase generation system 102 also includes the bias weight manager 906. The bias weight manager 906 can generate, determine, identify, utilize, and/or apply bias weights, including named entity bias weights, document position bias weights, and theme contribution bias weights. For example, as discussed above, the bias weight manager 906 can extract themes and determine theme contribution bias weights corresponding to digital documents. Similarly, the bias weight manager 906 can extracted named entities to determine named entity bias weights and analyze word positions within digital documents to determine document position bias weights.

Moreover, as shown, the keyphrase generation system 102 can include the random walk engine 908. The random walk engine 908 can apply, utilize, conduct, and/or implement a machine learning model (such as a random walk ranking algorithm). In particular, as described above, the random walk engine 908 can utilize a random walk ranking algorithm to generate word and/or keyphrase scores from a graph of a digital document. Moreover, as described above, the random walk engine 908 can bias the random walk ranking algorithm according to one, two, or more bias weights in generating word/keyphrase scores.

The keyphrase generation system 102 can also include the keyphrase selection manager 910. The keyphrase selection manager 910 can identify, select, and/or surface keyphrases. For example, as discussed above, the keyphrase selection manager 910 can generate keyphrase rankings (based on word/keyphrase scores) and select keyphrases. Moreover, the keyphrase selection manager 910 can generate keyphrase summaries from selected keyphrases. The keyphrase selection manager 910 can utilize keyphrases (e.g., to provide keyphrases for display, catalogue digital documents, and/or respond to queries).

In addition, as illustrated in FIG. 9, the keyphrase generation system 102 can also include the storage manager 912. The storage manager 912 can include one or more memory devices for storing information related to the keyphrase generation system 102. For instance, the storage manager 912 can store, recall, and/or maintain various models described herein, digital documents, word scores, keyphrase scores, keyphrase rankings, keyphrases, and/or keyphrase summaries.

In one or more embodiments, each of the components of the keyphrase generation system 102 are in communication with one another using any suitable communication technologies. Additionally, the components of the keyphrase generation system 102 are in communication with one or more other devices including one or more client devices described above. It will be recognized that although the components of the keyphrase generation system 102 are shown to be separate in FIG. 9, any of the subcomponents may be combined into fewer components, such as into a single component, or divided into more components as may serve a particular implementation. Furthermore, although the components of FIG. 9 are described in connection with the keyphrase generation system 102, at least some of the components for performing operations in conjunction with the keyphrase generation system 102 described herein may be implemented on other devices within the environment.

The components of the keyphrase generation system 102 can include software, hardware, or both. For example, the components of the keyphrase generation system 102 can include one or more instructions stored on a computer-readable storage medium and executable by processors (or at least one processor) of one or more processing devices/computing devices (e.g., the computing device 900). When executed by the one or more processors, the computer-executable instructions of the keyphrase generation system 102 can cause the computing device 900 to perform the methods described herein. Alternatively, the components of the keyphrase generation system 102 can comprise hardware, such as a special purpose processing device to perform a certain function or group of functions. Additionally, or alternatively, the components of the keyphrase generation system 102 can include a combination of computer-executable instructions and hardware.

Furthermore, the components of the keyphrase generation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the keyphrase generation system 92 may be implemented as part of a stand-alone application on a personal computing device or a mobile device. Alternatively, or additionally, the components of the keyphrase generation system 102 may be implemented in any application for displaying, modifying, or identifying digital content, including, but not limited to ADOBE MARKETING CLOUD, ADOBE EXPERIENCE CLOUD, ADOBE ACROBAT, ADOBE DOCUMENT CLOUD, ADOBE ANALYTICS, AND/OR ADOBE ADVERTISING CLOUD. The foregoing are either registered trademarks or trademarks of Adobe Inc. in the United States and/or other countries.

FIGS. 1-9 the corresponding text, and the examples provide a number of different systems, methods, and non-transitory computer readable media for generating keyphrase summaries from digital documents. In addition to the foregoing, embodiments can also be described in terms of flowcharts comprising acts for accomplishing a particular result. For example, FIG. 10 illustrates a flowchart of an example sequence or series of acts for generating a keyphrase summary from a digital document in accordance with one or more embodiments.

Figure 10:
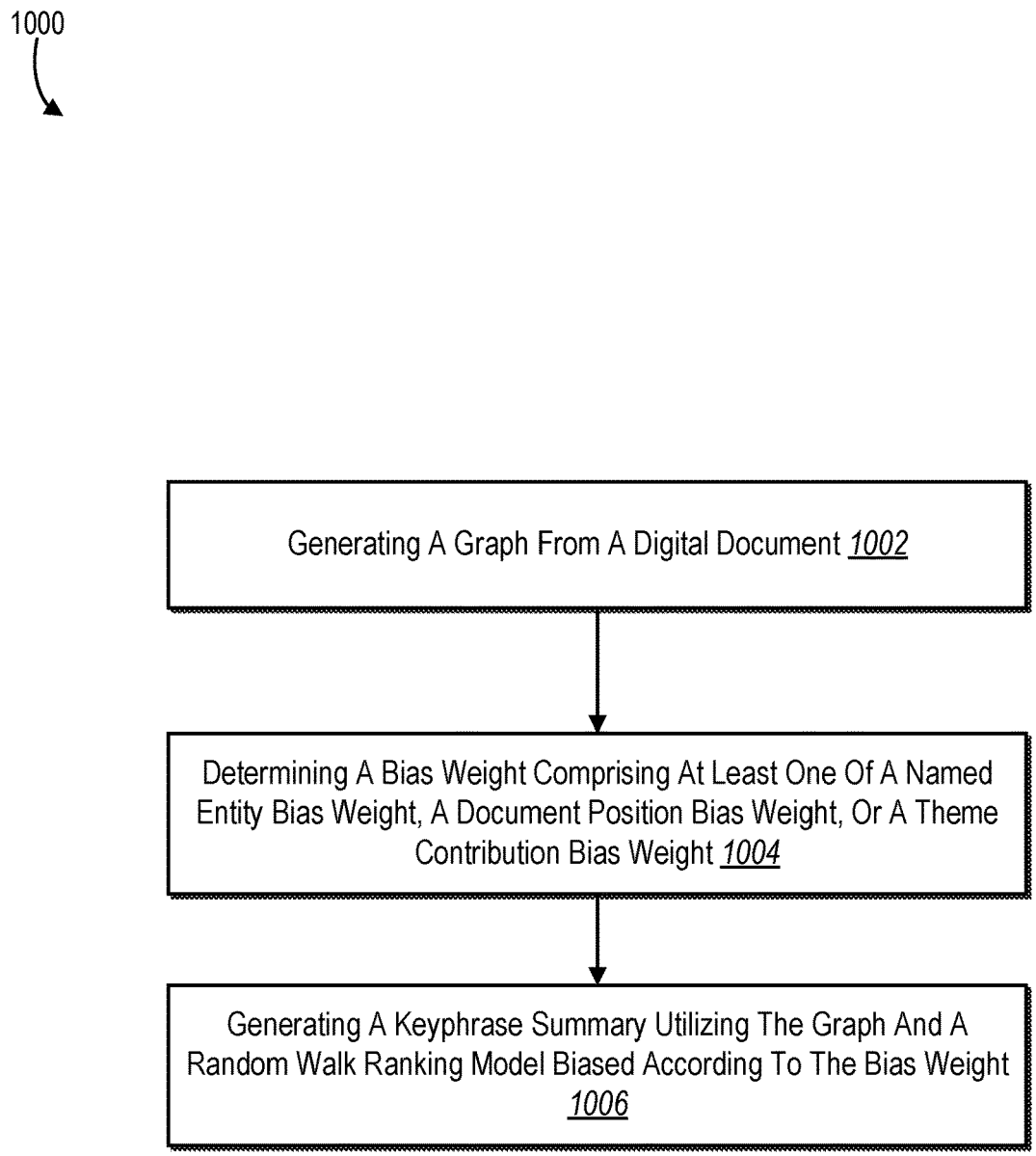
FIG. 10 illustrates a flowchart of a series of acts for generating a keyphrase summary from a digital document in accordance with one or more embodiments.

While FIG. 10 illustrates specific acts according to particular embodiments, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 that includes an act 1002 of generating a graph from a digital document. For example, the act 1002 can include generating a graph from a digital document by mapping words from the digital document to nodes of the graph and/or generating edges between the nodes based on word vicinities within the digital document. In some implementations, the act 1002 includes generating the edges between the nodes based on word vicinities within the digital document comprises generating an edge between a first node corresponding to a first word and a second word corresponding to a second node in response to determining a co-occurrence of the first word and the second word in the digital document within a threshold word window. In one or more embodiments, the act 1002 includes generating a token from the digital document utilizing a tokenizer model; determining a part of speech for the first word; and mapping the token and the part of speech to a first node of the nodes.

In addition, as shown in FIG. 10 the series of acts 1000 includes an act 1004 of determining a bias weight comprising at least one of a named entity bias weight, a document position bias weight, or a theme contribution bias weight. For example, the act 1004 can include determining named entity bias weights for the nodes of the graph utilizing frequencies of the words within named entities identified from the digital document. To illustrate, determining the named entity bias weights for the nodes can include: extracting the named entities from the digital document utilizing a named entity recognition model, wherein the named entities comprise proper nouns or time expressions; for a word of a node of the graph, determining a number of instances that the word appears in the named entities; and generating a named entity bias weight for the node based on the number of instances. In some embodiments, the act 1004 can include determining named entity bias weights, document position bias weights, and theme contribution bias weights for the nodes of the graph.

For instance, in some implementations, the act 1004 includes extracting themes and words corresponding to the themes from the digital document utilizing a clustering model and embeddings of the words; and generating theme contribution bias weights for the nodes of the graph utilizing the words corresponding to the themes. Furthermore, the act 1004 can include determining named entity bias weights for nodes of the graph utilizing frequencies of the words within named entities identified within the digital document.

In some implementations, the act 1004 includes extracting themes and words corresponding to the themes from the digital document utilizing a clustering model and embeddings of the words; generating theme contribution bias weights for the nodes of the graph utilizing the words corresponding to the themes; and generating the keyphrase summary utilizing the random walk ranking model biased according to the theme contribution bias weights and the named entity bias weights.

Moreover, in some embodiments, the act 1004 includes determining document position bias weights for the nodes of the graph based on positions of the words relative to a beginning of the digital document; and generating the keyphrase summary for the digital document utilizing the random walk ranking model biased according to the document position bias weights and the named entity bias weights.

In one or more embodiments, the act 1004 includes determining the document position bias weights by: determining a distance of a word within the digital document relative to a beginning of the digital document; and determining a document position bias weight for a node corresponding to the word utilizing the distance.

Furthermore, the act 1004 can also include determining the named entity bias weights by: extracting named entities from the digital document utilizing a named entity recognition model; and determining the named entity bias weights based on frequencies of the words within the named entities.

The act 1004 can also include determining the theme contribution bias weights by: extracting themes and words corresponding to the themes from the digital document utilizing a Gaussian mixture clustering model; and determining the theme contribution bias weights for the nodes of the graph based on the words corresponding to the themes.

Moreover, FIG. 10 shows that the series of acts 1000 also includes an act 1006 of generating a keyphrase summary utilizing the graph and a random walk ranking model biased according to the bias weight. For example, the act 1006 can include generating a keyphrase summary for the digital document utilizing the graph and a random walk ranking model biased according to the named entity bias weights for the nodes of the graph. Similarly, the act 1006 can include generating a keyphrase summary for the digital document utilizing a random walk ranking model biased according to the theme contribution bias weights and the named entity bias weights. Moreover, in some implementations, the act 1006 includes extracting a candidate keyphrase comprising a first word corresponding to a first node of the graph and a second word corresponding to a second node of the graph; generating a first word score for the first word utilizing the random walk ranking model biased according to a first named entity bias weight for the first node; and generating a second word score for the second word utilizing the random walk ranking model biased according to a second named entity bias weight for the second node. The act 1006 can also include generating a keyphrase score for the candidate keyphrase by combining the first word score and the second word score.

In some implementations, the act 1006 also includes determining a keyphrase ranking for a plurality of candidate keyphrases from the digital document by generating word scores utilizing the random walk ranking model biased according to the named entity bias weights; and selecting one or more candidate keyphrases to utilize in the keyphrase summary based on the keyphrase ranking. For instance, the act 1006 can include generating a filtered keyphrase ranking by filtering the plurality of candidate keyphrases utilizing a lexical similarity threshold; and selecting the one or more candidate keyphrases from the filtered keyphrase ranking.

In some implementations, the act 1006 can include determining a keyphrase ranking from the graph utilizing a random walk ranking model by biasing the random walk ranking model utilizing the named entity bias weights, the document position bias weights, and the theme contribution bias weights for the nodes of the graph; and generating a keyphrase summary for the digital document based on the keyphrase ranking.

Moreover, in one or more embodiments, the act 1006 includes generating the keyphrase summary for the digital document based on the keyphrase ranking by: generating a filtered keyphrase ranking from the keyphrase ranking utilizing a lexical similarity threshold; and generating the keyphrase summary from the filtered keyphrase ranking.

The series of acts 1000 can also include determining the named entity bias weights for the nodes by: extracting the named entities from the digital document utilizing a named entity recognition model; and generating a named entity bias weight for a node corresponding to a word of the digital document based on a number of instances that the word appears in the named entities. Moreover, the series of acts 1000 can include extracting the themes and the words corresponding to the themes by determining a first theme and a second theme; determining the theme contribution bias weights by determining, for a node of the graph, a first theme contribution bias weight corresponding to the first theme; and determining, for the node of the graph, a second theme contribution bias weight corresponding to the second theme.

In one or more embodiments, the series of acts 1000 includes generating the keyphrase summary for the digital document by: determining, for the node of the graph, a first theme-specific combined bias weight by combining the first theme contribution bias weight, a document position bias weight, and a named entity bias weight; and determining, for the node of the graph, a second theme-specific combined bias weight by combining the second theme contribution bias weight, the document position bias weight, and the named entity bias weight.

Moreover, the series of acts 1000 can also include generating the keyphrase summary for the digital document by: generating a first word score for the node utilizing the random walk ranking model by biasing the random walk ranking model utilizing the first theme-specific combined bias weight; generating a second word score for the node utilizing the random walk ranking model by biasing the random walk ranking model utilizing the second theme-specific combined bias weight; and determining an overall word score for the node by combining the first word score and the second word score.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
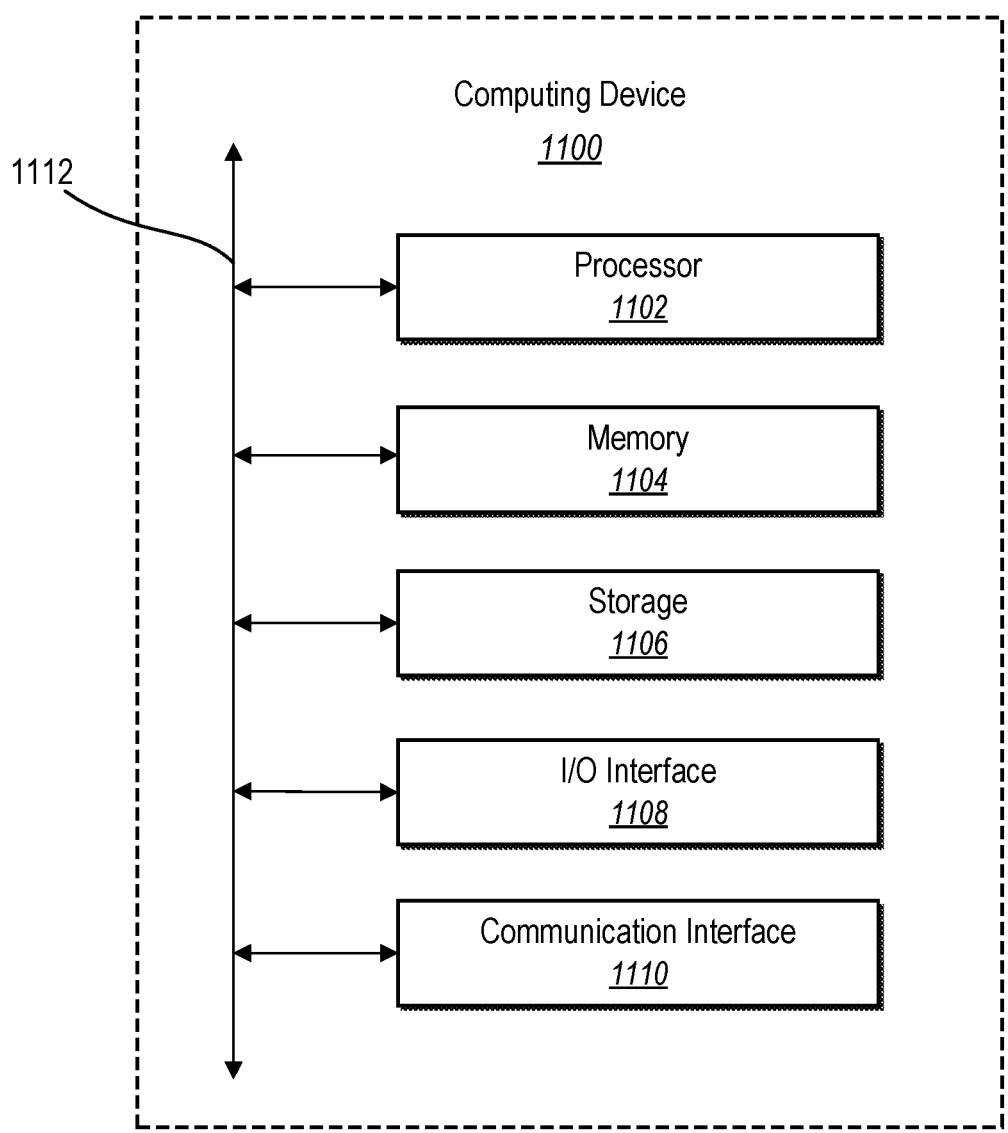
FIG. 11 illustrates a block diagram of an example computing device/processing device in accordance with one or more embodiments.

FIG. 11 illustrates, in block diagram form, an example computing device 1100 (e.g., the computing device 900, the client device 112, and/or the server(s) 104) that may be configured to perform one or more of the processes described above. One will appreciate that the keyphrase generation system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processing device, cause the at least one processing device to perform operations comprising:
    generating a graph from a digital document by mapping words from the digital document to nodes of the graph;
    determining named entity bias weights for the nodes of the graph utilizing frequencies with which the words corresponding to the nodes appear within named entities extracted from the digital document utilizing a named entity recognition model and numbers of instances that the words appear within the named entities; and
    generating a keyphrase summary for the digital document utilizing the graph and a machine learning model biased according to the named entity bias weights for the nodes of the graph.

2. The non-transitory computer readable medium of claim 1, wherein generating the graph comprises generating edges between the nodes based on word vicinities within the digital document by generating an edge between a first node corresponding to a first word and a second word corresponding to a second node in response to determining a co-occurrence of the first word and the second word in the digital document within a threshold word window.

3. The non-transitory computer readable medium of claim 1, wherein determining the named entity bias weights for the nodes comprises:
    extracting the named entities from the digital document utilizing the named entity recognition model, wherein the named entities comprise proper nouns;
    for a word of a node of the graph, determining a number of instances that the word appears within the named entities; and
    generating a named entity bias weight for the node based on the number of instances.

4. The non-transitory computer readable medium of claim 1, wherein generating the keyphrase summary comprises:
    extracting a candidate keyphrase comprising a first word corresponding to a first node of the graph and a second word corresponding to a second node of the graph;
    generating a first word score for the first word utilizing the machine learning model biased according to a first named entity bias weight for the first node; and
    generating a second word score for the second word utilizing the machine learning model biased according to a second named entity bias weight for the second node.

5. The non-transitory computer readable medium of claim 4, further comprising instructions that, when executed by the at least one processing device, further cause the at least one processing device to perform operations comprising generating a keyphrase score for the candidate keyphrase by combining the first word score and the second word score.

6. The non-transitory computer readable medium of claim 1, further comprising instructions that, when executed by the at least one processing device, further cause the at least one processing device to perform operations comprising:
    determining a keyphrase ranking for a plurality of candidate keyphrases from the digital document by generating word scores utilizing the machine learning model biased according to the named entity bias weights; and
    selecting one or more candidate keyphrases to utilize in the keyphrase summary based on the keyphrase ranking.

7. The non-transitory computer readable medium of claim 6, wherein selecting the one or more candidate keyphrases comprises:
    generating a filtered keyphrase ranking by filtering the plurality of candidate keyphrases utilizing a lexical similarity threshold; and
    selecting the one or more candidate keyphrases from the filtered keyphrase ranking.

8. The non-transitory computer readable medium of claim 1, further comprising instructions that, when executed by at least one processing device, further cause the at least one processing device to perform operations comprising:
    extracting themes and words corresponding to the themes from the digital document utilizing a clustering model and embeddings of the words;
    generating theme contribution bias weights for the nodes of the graph utilizing the words corresponding to the themes; and
    generating the keyphrase summary utilizing the machine learning model biased according to the theme contribution bias weights and the named entity bias weights.

9. The non-transitory computer readable medium of claim 1, further comprising instructions that, when executed by the at least one processing device, further cause the at least one processing device to perform operations comprising:
    determining document position bias weights for the nodes of the graph based on positions of the words relative to a beginning of the digital document; and
    generating the keyphrase summary for the digital document utilizing the machine learning model biased according to the document position bias weights and the named entity bias weights.

10. A system comprising:
    one or more memory devices; and
    one or more processing devices coupled to the one or more memory devices, the one or more processing devices configured to perform operations comprising:
        generating a graph by mapping words from a digital document to nodes of the graph;
        determining named entity bias weights for the nodes of the graph utilizing frequencies with which the words corresponding to the nodes appear within named entities identified from the digital document;
        determining a keyphrase ranking from the graph utilizing a machine learning model by biasing the machine learning model utilizing the named entity bias weights for the nodes of the graph; and generating a keyphrase summary for the digital document based on a filtered keyphrase ranking generated from the keyphrase ranking utilizing a lexical similarity threshold.

11. The system of claim 10, wherein generating the graph further comprises:
generating a token from the digital document utilizing a tokenizer model;
determining a part of speech for the token;
generating a first node from the token and the part of speech; and
generating edges from the first node based on word vicinities within the digital document.

12. The system of claim 10, wherein the one or more processing devices are further configured to perform operations comprising:
determining document position bias weights by:
determining a distance of a word within the digital document relative to a beginning of the digital document; and
determining a document position bias weight for a node corresponding to the word utilizing the distance; and
biasing the machine learning model utilizing the document position bias weights.

13. The system of claim 10, wherein determining the named entity bias weights further comprises:
extracting named entities from the digital document utilizing a named entity recognition model; and
determining the named entity bias weights based on frequencies of the appearance of words within the named entities.

14. The system of claim 10, wherein the one or more processing devices are further configured to perform operations comprising determining theme contribution bias weights by extracting themes and words corresponding to the themes from the digital document utilizing a Gaussian mixture clustering model.

15. The system of claim 14, wherein the one or more processing devices are further configured to perform operations comprising:
determining the theme contribution bias weights for the nodes of the graph based on the words corresponding to the themes; and
biasing the machine learning model utilizing the theme contribution bias weights.

16. A method comprising:
generating, by at least one processing device, a graph from a digital document by mapping words from the digital document to nodes of the graph;
extracting themes and words corresponding to the themes from the digital document utilizing a clustering model and embeddings of the words, wherein the themes comprise a first theme and a second theme;
generating theme contribution bias weights for the nodes of the graph utilizing the words corresponding to the themes by generating a first theme contribution bias weight corresponding to the first theme and a second theme contribution bias weight corresponding to the second theme; and
generating, by the at least one processing device, a keyphrase summary for the digital document utilizing a machine learning model biased according to the theme contribution bias weights.

17. The method of claim 16, further comprising:
determining named entity bias weights for the nodes by:
extracting named entities from the digital document utilizing a named entity recognition model;
generating a named entity bias weight for a node corresponding to a word of the digital document based on a number of instances that the word appears in the named entities; and
biasing the machine learning model according to the named entity bias weight.

18. The method of claim 16, further comprising:
extracting the themes and the words corresponding to the themes by determining the first theme and the second theme;
determining the theme contribution bias weights by determining, for a node of the graph, the first theme contribution bias weight corresponding to the first theme; and
determining, for the node of the graph, the second theme contribution bias weight corresponding to the second theme.

19. The method of claim 18, wherein generating the keyphrase summary for the digital document comprises:
determining, for the node of the graph, a first theme-specific combined bias weight by combining the first theme contribution bias weight, a document position bias weight, and a named entity bias weight; and
determining, for the node of the graph, a second theme-specific combined bias weight by combining the second theme contribution bias weight, the document position bias weight, and the named entity bias weight.

20. The method of claim 19, wherein generating the keyphrase summary for the digital document comprises:
generating a first word score for the node utilizing the machine learning model by biasing the machine learning model utilizing the first theme-specific combined bias weight;
generating a second word score for the node utilizing the machine learning model by biasing the machine learning model utilizing the second theme-specific combined bias weight; and
determining an overall word score for the node by combining the first word score and the second word score.

* * * * *